(12) United States Patent
Shimamoto et al.

(10) Patent No.: US 8,790,784 B2
(45) Date of Patent: Jul. 29, 2014

(54) INTERMEDIATE FILM FOR LAMINATED GLASS AND LAMINATED GLASS

(75) Inventors: Michio Shimamoto, Osaka (JP); Shota Matsuda, Osaka (JP); Sinyul Yang, Osaka (JP); Etsurou Hirota, Kouka (JP); Kohei Kani, Kouka (JP); Tatsuya Iwamoto, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/809,885

(22) PCT Filed: Jul. 15, 2011

(86) PCT No.: PCT/JP2011/066247
§ 371 (c)(1),
(2), (4) Date: Feb. 28, 2013

(87) PCT Pub. No.: WO2012/008582
PCT Pub. Date: Jan. 19, 2012

(65) Prior Publication Data
US 2013/0157065 A1    Jun. 20, 2013

(30) Foreign Application Priority Data

Jul. 16, 2010 (JP) ................................ 2010-161617
Jul. 16, 2010 (JP) ................................ 2010-161618
Jun. 29, 2011 (JP) ................................ 2011-144863

(51) Int. Cl.
*B32B 17/10* (2006.01)
(52) U.S. Cl.
USPC ............ 428/437; 428/436; 428/524; 428/525
(58) Field of Classification Search
USPC .................... 428/436, 437, 524, 525
See application file for complete search history.

(56) References Cited

U.S. PATENT DOCUMENTS

| 4,452,935 A | 6/1984 | Nomura et al. |
| 5,190,826 A | 3/1993 | Asahina et al. |

(Continued)

FOREIGN PATENT DOCUMENTS

| EP | 0 067 022 A1 | 12/1982 |
| EP | 0 457 190 A1 | 11/1991 |

(Continued)

OTHER PUBLICATIONS

International Search Report for the Application No. PCT/JP2011/066247 mailed Oct. 18, 2011.

(Continued)

*Primary Examiner* — D. S. Nakarani
(74) *Attorney, Agent, or Firm* — Cheng Law Group, PLLC

(57) ABSTRACT

The present invention provides an interlayer film for laminated glass having a monolayer structure comprising only a first layer or a multilayer structure comprising at least two layers including a first layer and a second layer stacked at least on one face of the first layer, wherein the first layer contains a thermoplastic resin and a first plasticizer represented by the formula (1):

[Chem. 1]

$$R1-O-\overset{O}{\underset{\|}{C}}-(CH_2)_n-\overset{O}{\underset{\|}{C}}-O-R2,$$ Formula (1)

and the interlayer film has a monolayer structure or a multilayer structure including at least two layers and includes the first layer further containing a second plasticizer that is a diester compound, or the interlayer film has a multilayer structure including at least two layers and includes the second layer containing a plasticizer and a polyvinyl acetal resin with a hydroxyl content of 25 to 40 mol %.

25 Claims, 3 Drawing Sheets

(56) References Cited

U.S. PATENT DOCUMENTS

| | | | |
|---|---|---|---|
| 8,313,838 B2* | 11/2012 | Steuer et al. | 428/436 |
| 2006/0058439 A1* | 3/2006 | Keller | 524/386 |
| 2010/0124647 A1 | 5/2010 | Keller et al. | |

FOREIGN PATENT DOCUMENTS

| | | |
|---|---|---|
| EP | 1 977 885 A1 | 10/2008 |
| JP | 57-200250 A | 12/1982 |
| JP | 4-254444 A | 9/1992 |
| JP | 2007-70200 A | 3/2007 |
| JP | 2010-100512 A | 5/2010 |
| JP | 2010-59009 A | 7/2010 |
| JP | 2010-523449 A | 7/2010 |
| WO | WO-2008/122608 A1 | 10/2008 |

OTHER PUBLICATIONS

International Preliminary Report on Patentability for Application No. PCT/JP2011/066247 dated Sep. 19, 2012.
International Preliminary Report on Patentability for Application No. PCT/JP2011/066247 mailed Feb. 21, 2013.

* cited by examiner

INTERMEDIATE FILM FOR LAMINATED GLASS AND LAMINATED GLASS

TECHNICAL FIELD

The present invention relates to an interlayer film for laminated glass containing a thermoplastic resin and a plasticizer. More specifically, the present invention relates to an interlayer film for laminated glass which can provide a laminated glass excellent in sound insulation, and also relates to a laminated glass produced using the interlayer film for laminated glass.

BACKGROUND ART

A laminated glass is a safety glass because few glass fragments are scattered even if it is broken by impact from the outside. Therefore, the laminated glass has been used widely for automobiles, railway cars, aircrafts, vessels, buildings, and the like. The laminated glass has an interlayer film interposed between a pair of glass sheets.

Recently, reduction in thickness of the laminated glass has been considered for weight reduction of the laminated glass. Reduction in thickness of the laminated glass however causes deterioration in sound insulation of the laminated glass. Use of the laminated glass with poor sound insulation as windshields of automobiles may problematically result in insufficient sound insulation for sound with a frequency of about 5000 Hz such as whizzing sound and driving sound of windshield wipers.

Change in materials of interlayer films is now considered to increase the sound insulation of the laminated glass.

Patent Document 1 provides one example of the interlayer film for laminated glass; that is, Patent Document 1 teaches a sound insulation layer that contains 100 parts by weight of a polyvinyl acetal resin having an acetalization degree of 60 to 85 mol %, 0.001 to 1.0 part by weight of at least one metal salt of alkali metal salts and alkaline earth metal salts, and 30 parts by weight or more of a plasticizer. This sound insulation layer can be used alone as an interlayer film, or used as a multilayer interlayer film in the form of a stack with other layer(s).
Patent Document 1: JP 2007-070200 A

SUMMARY OF THE INVENTION

Problems to be Solved by the Invention

Though a laminated glass including an interlayer film disclosed in Patent Document 1 can increase the sound insulation to some degree, further increase in the sound insulation is now required.

The sound to be insulated by the interlayer film includes air-borne sound such as vehicle noises and horns, and solid born sound such as vibrations of vehicle engines. The laminated glass including an interlayer film disclosed in Patent Document 1 may fail to sufficiently increase the sound insulation especially for solid born sound.

Meanwhile, considerations have been made in recent years to add an excessive amount of a plasticizer to an interlayer film for increasing the sound insulation of a laminated glass. Addition of an excessive amount of a plasticizer can improve the sound insulation of the laminated glass. However, an excessive amount of the plasticizer sometimes causes bleeding of the plasticizer on the surface of the interlayer film and bubble formation in the laminated glass.

The present invention aims to provide an interlayer film for laminated glass which can give a laminated glass with better sound insulation when used in the laminated glass; and a laminated glass using the interlayer film for laminated glass.

The present invention limitedly aims to provide an interlayer film for laminated glass which can give a laminated glass with better sound insulation and better penetration resistance when used in the laminated glass; and a laminated glass using the interlayer film for laminated glass.

The present invention further limitedly aims to provide an interlayer film for laminated glass which can give a laminated glass that is not only excellent in the sound insulation but also capable of suppressing bubble formation and bubble growth; and a laminated glass using the interlayer film for laminated glass.

Means for Solving the Problems

According to a broad aspect of the present invention, the present invention provides an interlayer film for laminated glass having a monolayer structure comprising only a first layer or a multilayer structure comprising at least two layers including a first layer and a second layer stacked at least on one face of the first layer, wherein the first layer contains a thermoplastic resin and a first plasticizer represented by the formula (1), and the interlayer film has a monolayer structure or a multilayer structure including at least two layers and includes the first layer further containing a second plasticizer that is a diester compound, or the interlayer film has a multilayer structure including at least two layers and includes the second layer containing a plasticizer and a polyvinyl acetal resin with a hydroxyl content of 25 to 40 mol %.

[Chem. 1]

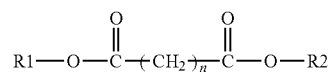

Formula (1)

In the formula (1), R1 and R2 each represent an organic group containing at least one ether bond and n represents an integer of 2 to 8.

According to a specific aspect of the interlayer film for laminated glass of the present invention, R1 and R2 in the formula (1) each represent a group containing a carbon atom and an oxygen atom in a total number of at most 12.

According to a specific aspect of the interlayer film for laminated glass of the present invention, R1 and R2 in the formula (1) each have at least one ether bond structural unit represented by the formula (11) or the formula (12)

[Chem. 2]

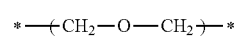

Formula (11)

[Chem. 3]

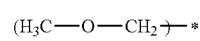

Formula (12)

According to a specific aspect of the interlayer film for laminated glass of the present invention, R1 is a group represented by the formula (21) and R2 is a group represented by the formula (26) in the formula (1)

[Chem. 4]

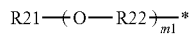

Formula (21)

In the formula (21), R21 represents an alkyl group having 1 to 10 carbon atom(s), R22 represents an alkylene group having 1 to 10 carbon atom(s), and m1 represents an integer of 1 to 5.

[Chem. 5]

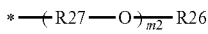

Formula (26)

In the formula (26), R26 represents an alkyl group having 1 to 10 carbon atom(s), R27 represents an alkylene group having 1 to 10 carbon atom(s), and m2 represents an integer of 1 to 5.

When the interlayer film has a monolayer structure or a multilayer structure including at least two layers and includes the first layer further containing a second plasticizer that is a diester compound, the second plasticizer is preferably represented by the formula (51).

[Chem. 6]

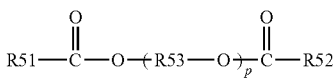

Formula (51)

In the formula (51), R51 and R52 each represent an organic group having 5 to 10 carbon atoms, R53 represents an ethylene group, isopropylene group or n-propylene group, and p represents an integer of 3 to 10.

When the interlayer film has a monolayer structure or a multilayer structure including at least two layers and includes the first layer further containing a second plasticizer that is a diester compound, the first layer preferably contains the first plasticizer and the second plasticizer at a weight ratio of 1:9 to 8.5:1.5.

When the interlayer film has a multilayer structure including at least two layers and includes the second layer containing a plasticizer and a polyvinyl acetal resin with a hydroxyl content of 25 to 40 mol %, the plasticizer in the second layer is preferably a second plasticizer that is a diester compound. The second plasticizer that is a diester compound in the second layer is preferably a second plasticizer represented by the formula (51).

When the interlayer film has a multilayer structure including at least two layers and includes the second layer containing a plasticizer and a polyvinyl acetal resin with a hydroxyl content of 25 to 40 mol %, the first layer further preferably contains a second plasticizer that is a diester compound. The second plasticizer that is a diester compound in the first layer is second plasticizer represented by the formula (51).

when the interlayer film has a multilayer structure including at least two layers and includes the second layer containing a plasticizer and a polyvinyl acetal resin with a hydroxyl content of 25 to 40 mol %, the first layer preferably further contains a second plasticizer that is a diester compound and the first layer preferably contains the first plasticizer and the second plasticizer at a weight ratio of 1:9 to 8.5:1.5.

When the interlayer film has a multilayer structure including at least two layers and includes the second layer containing a plasticizer and a polyvinyl acetal resin with a hydroxyl content of 25 to 40 mol %, the polyvinyl acetal resin in the second layer preferably has an acetal group with 3 or 4 carbon atoms, an acetalization degree of 60 to 75 mol %, and an acetylation degree of 0 to 10 mol %.

The thermoplastic resin in the first layer is preferably a polyvinyl acetal resin. The polyvinyl acetal resin in the first layer preferably has a hydroxyl content of at most 25 mol %.

The polyvinyl acetal resin in the first layer is preferably obtained by acetalization of a polyvinyl alcohol having an average degree of polymerization of 2700 to 5000.

In a yet another specific aspect of the interlayer film for laminated glass according to the present invention, the thermoplastic resin in the first layer contains a high molecular weight component having an absolute molecular weight of at least 1 million and the high molecular weight component accounts for at least 7.4% of the thermoplastic resin in the first layer, or the thermoplastic resin in the first layer contains a high molecular weight component having a polystyrene-equivalent molecular weight of at least 1 million and the high molecular weight component accounts for at least 9% of the thermoplastic resin in the first layer.

According to a specific aspect of the interlayer film for laminated glass of the present invention, when the first layer is used as a resin film with a glass transition temperature of Tg (° C.) for measurement of the viscoelasticity, an elasticity G'(Tg+80) at (Tg+80)° C. and an elasticity G'(Tg+30) at (Tg+30)° C. have a ratio (G'(Tg+80)/G'(Tg+30)) of at least 0.65.

According to a specific aspect of the interlayer film for laminated glass of the present invention, the thermoplastic resin in the first layer is a polyvinyl acetal resin, and when the viscoelasticity of a resin film containing 100 parts by weight of the polyvinyl acetal resin in the first layer and 60 parts by weight of triethylene glycol di-2-ethylhexanoate (3GO) as a plasticizer and having a glass transition temperature of Tg (° C.) for measurement of the viscoelasticity, an elasticity G'(Tg+80) at (Tg+80)° C. and an elasticity G'(Tg+30) at (Tg+30)° C. have a ratio (G'(Tg+80)/G'(Tg+30)) of at least 0.65.

According to a specific aspect of the interlayer film for laminated glass of the present invention, the thermoplastic resin in the first layer is a polyvinyl acetal resin, and the polyvinyl acetal resin in the first layer is obtained by acetalization of a polyvinyl alcohol resin having an average degree of polymerization of more than 3000.

According to a specific aspect of the interlayer film for laminated glass of the present invention, the thermoplastic resin in the first layer is preferably a polyvinyl acetal resin, and the polyvinyl acetal resin in the first layer preferably has an acetylation degree of at least 8 mol %, or an acetylation degree of less than 8 mol % and an acetalization degree of at least 68 mol %. The polyvinyl acetal resin in the first layer preferably has an acetylation degree of at least 8 mol %. The polyvinyl acetal resin in the first layer preferably has an acetylation degree of less than 8 mol % and an acetalization degree of at least 68 mol %.

According to a specific aspect of the interlayer film for laminated glass of the present invention, the interlayer film has a monolayer structure or a multilayer structure including at least two layers, and the interlayer film includes the first layer containing the thermoplastic resin, the first plasticizer represented by the formula (1), and the second plasticizer that is a diester compound.

According to a specific aspect of the interlayer film for laminated glass of the present invention, the interlayer film has a monolayer structure, and the interlayer film includes the first layer containing the thermoplastic resin, the first plasticizer represented by the formula (1), and the second plasticizer that is a diester compound.

According to a specific aspect of the interlayer film for laminated glass of the present invention, the interlayer film has a multilayer structure including at least two layers, and the interlayer film includes the first layer containing the thermoplastic resin, the first plasticizer represented by the formula (1), and the second plasticizer that is a diester compound, and the second layer stacked at least on one face of the first layer.

According to a specific aspect of the interlayer film for laminated glass of the present invention, the interlayer film has a multilayer structure including at least two layers, and the interlayer film includes the first layer containing the thermoplastic resin and the first plasticizer represented by the formula (1), and the second layer that is stacked at least on one face of the first layer and contains the plasticizer and the polyvinyl acetal resin with a hydroxyl content of 25 to 40 mol %.

According to a specific aspect of the interlayer film for laminated glass of the present invention, the interlayer film has a multilayer structure including at least two layers, the thermoplastic resin in the first layer is a polyvinyl acetal resin, the second layer contains a polyvinyl acetal resin, the amount of the plasticizer is at least 50 parts by weight for 100 parts by weight of the polyvinyl acetal resin in the first layer, a hydroxyl content in the polyvinyl acetal resin in the first layer is lower than a hydroxyl content in the polyvinyl acetal resin in the second layer, a difference in the hydroxyl content is at most 9.2 mol % between the polyvinyl acetal resin in the first layer and the polyvinyl acetal resin in the second layer, and the polyvinyl acetal resin in the first layer has an acetylation degree of at most 8 mol % when the difference in the hydroxyl content is more than 8.5 mol % and at most 9.2 mol % between the polyvinyl acetal resin in the first layer and the polyvinyl acetal resin in the second layer.

A laminated glass according to the present invention comprises: a first component for laminated glass; a second component for laminated glass; an interlayer film between the first component for laminated glass and the second component for laminated glass, wherein the interlayer film having a monolayer structure or a multilayer structure includes the interlayer film for laminated glass according to the present invention.

Effect of the Invention

An interlayer film for laminated glass according to the present invention has a monolayer structure or a multilayer structure including at least two layers, wherein the first layer contains a thermoplastic resin and a first plasticizer represented by the formula (1) and the interlayer film has a monolayer structure or a multilayer structure including at least two layers and includes the first layer further containing a second plasticizer that is a diester compound, or the interlayer film has a multilayer structure including at least two layers and includes the second layer containing a plasticizer and a polyvinyl acetal resin with a hydroxyl content of 25 to 40 mol %. Therefore, the interlayer film for laminated glass according to the present invention can increase the sound insulation of the laminated glass.

MODE(S) FOR CARRYING OUT THE INVENTION

Figure 1:
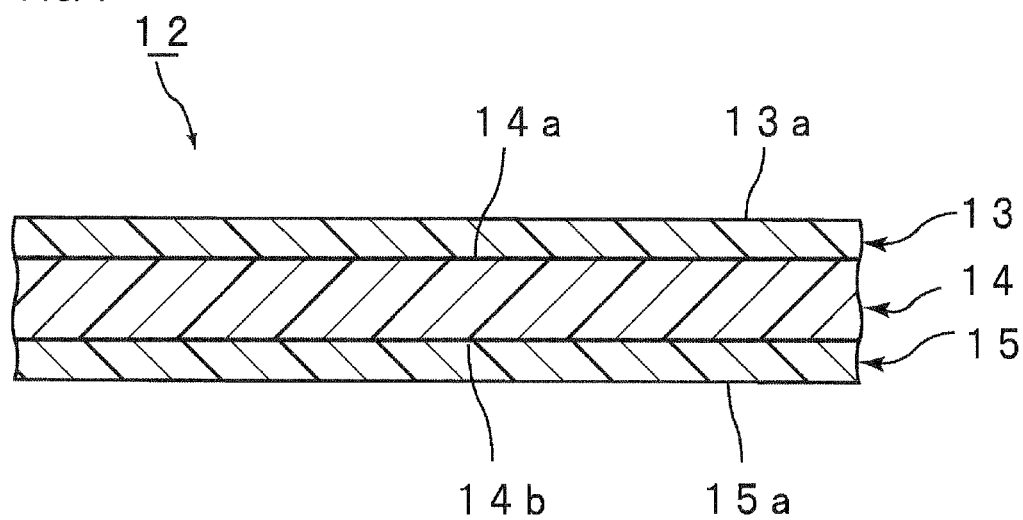
FIG. 1 is a partially notched cross-sectional view schematically illustrating an interlayer film for laminated glass according to a first embodiment of the present invention.

The present invention is specifically described in the following.

The interlayer film for laminated glass according to the present invention has a monolayer structure including only a first layer or a multilayer structure including at least two layers of a first layer and a second layer stacked at least on one face of the first layer. The interlayer film for laminated glass according to the present invention includes the first layer containing a thermoplastic resin and a first plasticizer represented by the formula (1).

The interlayer film for laminated glass according to the present invention may be a monolayer interlayer film for laminated glass having only the first layer. Or alternatively, the interlayer film for laminated glass according to the present invention may be a multilayer interlayer film for laminated glass having the first layer and the second layer.

The interlayer film for laminated glass according to the present invention includes the first layer containing a thermoplastic resin and a first plasticizer represented by the formula (1).

The interlayer film for laminated glass according to the present invention has a monolayer structure or a multilayer structure including at least two layers and includes the first layer containing a second plasticizer that is a diester compound (pattern (i)). Alternatively, the interlayer film for laminated glass according to the present invention has a multilayer structure including at least two layers and includes the second layer containing a plasticizer and a polyvinyl acetal resin with a hydroxyl content of 25 to 40 mol % (pattern (ii)).

In the pattern (i), specifically, the interlayer film has a monolayer structure or a multilayer structure including at least two layers and includes the first layer containing a thermoplastic resin, a first plasticizer represented by the formula (1), and a second plasticizer that is a diester compound. In the pattern (i), the interlayer film has a monolayer structure and includes the first layer containing a thermoplastic resin, a first plasticizer represented by the formula (1), and a second plasticizer that is a diester compound (pattern i-1), or alternatively, the interlayer film has a multilayer structure including at least two layers and includes the first layer containing a thermoplastic resin, a first plasticizer represented by the formula (1), and a second plasticizer that is a diester compound (pattern i-2). In the pattern (i-2), components contained in the second layer are not particularly limited. The second layer preferably contains a thermoplastic resin, more preferably a thermoplastic resin and a plasticizer, and still more preferably a polyvinyl acetal resin and a plasticizer.

[Chem. 7]

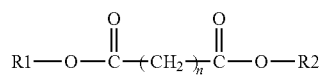

Formula (1)

In the formula (1), R1 and R2 each represent an organic group having at least one ether bond, and n represents an integer of 2 to 8.

The above structure of the interlayer film for laminated glass according to the present invention allows increase in the sound insulation of a laminated glass including the interlayer film. In the case where the interlayer film for laminated glass according to the present invention has a multilayer structure including at least two layers, the above structure of the multilayer interlayer film allows increase in the sound insulation and penetration resistance of a laminated glass including the interlayer film. Especially in the pattern (ii) "the interlayer film for laminated glass according to the present invention has a multilayer structure including at least two layers and includes the second layer containing a plasticizer and a polyvinyl acetal resin with a hydroxyl content of 25 to 40 mol %" and the pattern (i-2) "the interlayer film has a multilayer structure including at least two layers and includes the first layer containing a thermoplastic resin, a first plasticizer represented by the formula (1), and a second plasticizer that is a diester compound", the sound insulation and penetration resistance of the resulting laminated glass are efficiently increased.

The first plasticizer represented by the formula (1) increases the sound insulation at comparatively low temperatures (around 0° C.). The second plasticizer that is a diester compound increases the sound insulation at comparatively high temperatures (around 20° C.). Combination use of the first plasticizer represented by the formula (1) and the second plasticizer that is a diester compound allows increase in the sound insulation of the laminated glass including the interlayer film for laminated glass according to the present invention in a wide temperature range.

Use of only the first plasticizer represented by the formula (1) as the plasticizer tends to cause bleeding of the plasticizer. Especially in the case where the interlayer film has a monolayer structure and includes the first layer containing only the first plasticizer represented by the formula (1) as the plasticizer, the plasticizer tends to bleed and the penetration resistance of the laminated glass tends to be lowered. In contrast, use of the second plasticizer that is a diester compound as well as the first plasticizer represented by the formula (1) in the first layer suppresses bleeding of the plasticizer. From the standpoint of suppression of bleeding of the plasticizer, the first layer preferably contains the first plasticizer represented by the formula (1) and the second plasticizer that is a diester compound. Use of a laminate including the second layer stacked on the first layer containing the first plasticizer suppresses the bleeding of the plasticizer and increases the penetration resistance of the laminated glass. The second layer contributes to increase in the adhesiveness to the components for laminated glass and increase in the penetration resistance of the laminated glass. Especially, the second layer containing the plasticizer and the polyvinyl acetal resin with a hydroxyl content of 25 to 40 mol % significantly contributes to increase in the penetration resistance of the laminated glass.

Hereinafter, the present invention will be described by means of specific embodiments and examples of the present invention, with reference to the drawings.

FIG. 1 is a partially notched cross-sectional view schematically illustrating an interlayer film for laminated glass according to a first embodiment of the present invention.

An interlayer film 12 illustrated in FIG. 1 is a multilayer interlayer film having a multilayer structure including at least two layers, more specifically having a multilayer structure including at least three layers. More specifically, the interlayer film 12 has a multilayer structure including three layers. The interlayer film 12 is used for forming a laminated glass. The interlayer film 12 is an interlayer film for laminated glass. The interlayer film 12 has a first layer 14 (interlayer film), a second layer 13 (interlayer film) stacked on one face 14a (first face) of the first layer 14, and a second layer 15 (interlayer film) stacked on the other face 14b (second face) of the first layer 14.

In the first embodiment, the first layer 14 contains a thermoplastic resin and a first plasticizer represented by the formula (1). The thermoplastic resin is preferably a polyvinyl acetal resin. In the interlayer film 12, the first layer 14 is an intermediate layer. The first layer is preferably an intermediate layer. Since the first layer contains a thermoplastic resin and the first plasticizer represented by the formula (1), the sound insulation of the first layer is excellent. The first layer may be used as a sound insulation layer in the laminated glass, for example.

The second layer 13 and the second layer 15 each contain a plasticizer and a polyvinyl acetal resin with a hydroxyl content of 25 to 40 mol %. It is to be noted that in the case where the second layer 13 contains a plasticizer and a polyvinyl acetal resin with a hydroxyl content of 25 to 40 mol %, the second layer 15 may not contain these components. In the interlayer film 12, the second layer 13 and the second layer 15 are surface layers. The second layers are preferably surface layers. The second layers may be used as protective layers in the laminated glass, for example.

The second layer 13 and the second layer 15 each contains a plasticizer and a polyvinyl acetal resin with a hydroxyl content of 25 to 40 mol %. In the case where the first layer 14 containing the second plasticizer that is a diester compound in addition to the thermoplastic resin and the first plasticizer represented by the formula (1), the components contained in the second layer 13 and the second layer 15 are not particularly limited. In the case where the first layer 14 contains the second plasticizer that is a diester compound in addition to the thermoplastic resin and the first plasticizer represented by the formula (1), the second layer 13 and the second layer 15 each preferably contain a thermoplastic resin, more preferably a thermoplastic resin and a plasticizer, and still more preferably a polyvinyl acetal resin and a plasticizer.

In the case of a multilayer interlayer film for laminated glass having a multilayer structure including at least two layers, the interlayer film for laminated glass according to the present invention includes the second layer stacked at least on one face of the first layer. Namely, the second layer may be formed only on one face of the first layer or the second layers may be formed on one face (first face) and on the other face (second face). Both faces of the first layer may each have one second layer stacked thereon. In the case where the second layers are stacked on both faces of the first layer, the second layers may be the same as or different from each other. In the case where the second layer is stacked only on one face of the first layer, a layer different from the second layer may be stacked on the other face of the first layer. For example, a layer containing heat insulating particles such as metal oxide particles may be stacked on the other face of the first layer.

In the case of the multilayer interlayer film for laminated glass having a multilayer structure including at least two layers, the interlayer film for laminated glass according to the present invention has at least one first layer and at least one second layer, namely, both the first layer and the second layer. The interlayer film may optionally have other layer(s) other than the first layer and the second layer. For example, use of a layer containing heat insulating particles such as metal oxide particles increases the heat insulation.

Figure 2:
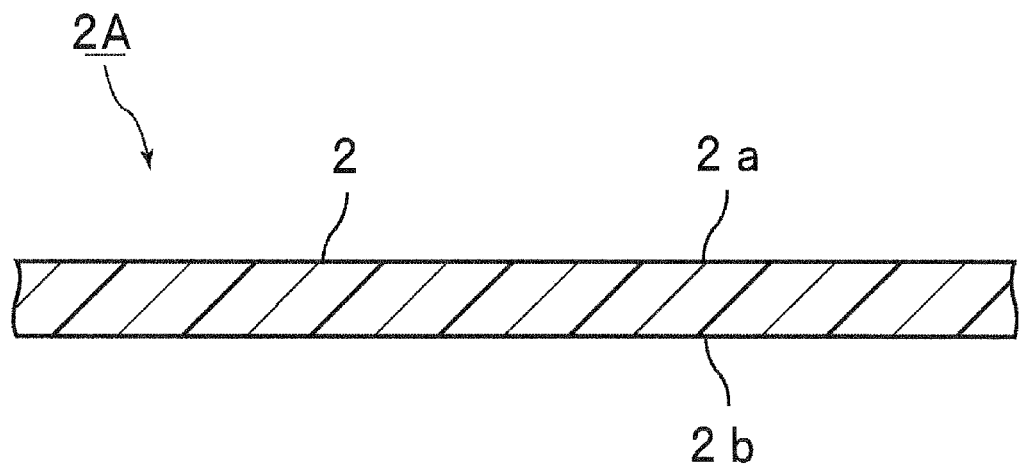
FIG. 2 is a partially notched cross-sectional view schematically illustrating an interlayer film for laminated glass according to a second embodiment of the present invention.

FIG. 2 is a partially notched cross-sectional view schematically illustrating an interlayer film for laminated glass according to a second embodiment of the present invention.

An interlayer film 2A illustrated in FIG. 2 has a first layer 2. The interlayer film 2A has a monolayer structure including only the first layer 2 and is a monolayer interlayer film. The interlayer film 2A is the first layer 2. The interlayer film 2A is used for forming a laminated glass. The interlayer film 2A is an interlayer film for laminated glass.

The interlayer film 2A and the first layer 2 contains the thermoplastic resin, the first plasticizer represented by the formula (1), and the second plasticizer that is a diester compound. The thermoplastic resin is preferably a polyvinyl acetal resin. Accordingly, the interlayer film 2A having a monolayer structure contains the second plasticizer that is a diester compound, in addition to the thermoplastic resin and the first plasticizer represented by the formula (1).

An interlayer film for laminated glass having a multilayer structure with increased sound insulation tends to cause bubble formation and bubble growth. The present inventors have found out that, in an interlayer film for laminated glass having a multilayer structure, the plasticizer migrates among layers to form a layer containing a larger amount of the plasticizer. For example, the plasticizer in the second layer may migrate to the first layer to increase the amount of the plasticizer in the first layer. Formation of a layer containing a large amount of the plasticizer, namely, increase in the plasticizer content of the first layer may cause easy bubble formation in the laminated glass including the interlayer film for laminated glass. In addition, bubble formation is once generated, the generated bubbles may become core to cause bubble growth.

From the standpoint of suppression of bubble formation and bubble growth, the following composition is preferable. The amount of all the plasticizers is at least 50 parts by weight for 100 parts by weight of the polyvinyl acetal resin in the first layer, a hydroxyl content of the polyvinyl acetal resin in the first layer is lower than a hydroxyl content of the polyvinyl acetal resin in the second layer, a difference in the hydroxyl content is at most 9.2 mol % between the polyvinyl acetal resin in the first layer and the polyvinyl acetal resin in the second layer (hereinafter, also referred to as content difference (1-2)), and in the case where the difference (content difference (1-2)) in the hydroxyl content is more than 8.5 mol % and at most 9.2 mol % between the polyvinyl acetal resin in the first layer and the polyvinyl acetal resin in the second layer, the polyvinyl acetal resin in the first layer has an acetylation degree of at most 8 mol %. The content difference (1-2) may be higher than 8.5 mol % and at most 9.2 mol %, and further may be at most 8.5 mol %.

The present inventors have made various studies to suppress bubble formation and bubble growth, and have found that the bubble formation and the bubble growth in a laminated glass can be sufficiently suppressed if the hydroxyl content of the polyvinyl acetal resin in each of the first layer and the second layer is controlled as mentioned earlier. Since migration of the plasticizer can be inhibited, and also bubble formation and bubble growth in the laminated glass can be sufficiently suppressed, the amount of the plasticizer in each layer, especially the amount of the plasticizer in the first layer can be increased. As a result, the sound insulation of the laminated glass can be further increased.

It is to be noted that bubble formation is more likely to be caused in the case where the amount of all the plasticizers for 100 parts by weight of the polyvinyl acetal resin in the first layer is larger than the amount of all the plasticizers for 100 parts by weight of the polyvinyl acetal resin in the second layer. In addition, once bubble formation is caused, the bubbles may become nuclei to cause bubble growth. To solve this problem, control of the hydroxyl content of the polyvinyl acetal resin in each of the first layer and the second layer as mentioned earlier sufficiently suppresses bubble formation and bubble growth in the laminated glass.

In terms of further suppressing bubble formation and bubble growth in the laminated glass, the minimum value of difference between the hydroxyl content of the polyvinyl acetal resin in the first layer and the hydroxyl content of the polyvinyl acetal resin in the second layer (content difference (1-2)) is preferably 0.1 mol %, more preferably 1 mol %, and still more preferably 2 mol %. The maximum value of the difference is preferably 8.5 mol %, more preferably 7.8 mol %, still more preferably 7 mol %, and particularly preferably 5.6 mol %. The difference between the hydroxyl content of the polyvinyl acetal resin in the first layer and the hydroxyl content of the polyvinyl acetal resin in the second layer (content difference (1-2)) is preferably at most 5 mol %, more preferably at most 4.5 mol %, still more preferably at most 4 mol %, and further preferably at most 3.5 mol % because bubble formation and bubble growth in the laminated glass can be further suppressed.

The thermoplastic resin in the first layer preferably contains a high molecular weight component having an absolute molecular weight of at least 1 million (hereinafter, also referred to as high molecular weight component X) or a high molecular weight component having a polystyrene-equivalent molecular weight (hereinafter, also referred to as high molecular weight y) of at least 1 million (hereinafter, also referred to as high molecular weight component Y). The high molecular weight component X and the high molecular weight component Y each are a thermoplastic resin. Preferably, the high molecular weight component X accounts for at least 7.4% of the thermoplastic resin in the first layer, or the high molecular weight component Y accounts for at least 9% of the thermoplastic resin in the first layer.

Bubble formation in the laminated glass is suppressed in the case where the thermoplastic resin in the first layer contains a specific proportion of the high molecular weight component X having an absolute molecular weight of at least 1 million. Alternatively, bubble formation in the laminated glass is also suppressed in the case where the thermoplastic resin in the first layer contains a specific proportion of the high molecular weight component Y having a molecular weight y of at least 1 million.

The proportion of the high molecular weight component X in the thermoplastic resin in the first layer is determined as a percentage value of the area of a region corresponding to the high molecular weight component X occupying in the peak area of the thermoplastic resin component obtained in the measurement of the absolute molecular weight. The proportion of the high molecular weight component Y in the thermoplastic resin in the first layer is determined as a percentage value of the area of a region corresponding to the high molecular weight component Y occupying in the peak area of the thermoplastic resin component obtained in the measurement of the molecular weight of polystyrene.

The second layer preferably has a composition different from that of the first layer. The polyvinyl acetal resin in the second layer may contain the high molecular weight component X having an absolute molecular weight of at least 1 million and the high molecular weight component X may account for at least 7.4% of the polyvinyl acetal resin in the second layer. Alternatively, the polyvinyl acetal resin in the second layer may contain the high molecular weight component Y having a molecular weight y of at least 1 million and the high molecular weight component Y accounts for at least 9% of the polyvinyl acetal resin in the second layer.

From the standpoint of further increase in the sound insulation of the laminated glass and further suppression of bubble formation and bubble growth, the minimum value of proportion of the high molecular weight component X having an absolute molecular weight of at least 1 million is preferably 8%, more preferably 8.5%, still more preferably 9%, particularly preferably 9.5%, and most preferably 10%. From the standpoint of still further increase in the sound insulation of the laminated glass and further suppression of bubble formation and bubble growth, the proportion of the high molecular weight component X having an absolute molecular weight of at least 1 million is preferably at least 11%, more preferably at least 12%, still more preferably at least 14%, and particularly preferably at least 16%. The upper limit of the proportion of the high molecular weight component X is not particularly limited, and is preferably 40%, more preferably 30%, and still more preferably 25%.

In the case where the thermoplastic resin in the first layer contains the high molecular weight component Y having a molecular weight y of at least 1 million, the minimum value of proportion of the high molecular weight component Y in the thermoplastic resin in the first layer is preferably 10%, more preferably 11%, still more preferably 11.5%, and particularly preferably 12%. From the standpoint of further increase in the sound insulation of the laminated glass and further suppressing bubble formation and bubble growth, the proportion of the high molecular weight component Y is preferably at least 12.5%, more preferably at least 13.5%, still more preferably at least 14%, particularly preferably at least 15%, and most preferably at least 18%. The maximum value of proportion of the high molecular weight component Y is not particularly limited, and is preferably 40%, more preferably 30%, and still more preferably 25%. The proportion of the high molecular weight component Y of at least the above lower limit further increases the sound insulation of the laminated glass and further suppresses bubble formation and bubble growth.

When a resin film A that contains 100 parts by weight of the polyvinyl acetal resin in the first layer and 60 parts by weight of triethyleneglycol di-2-ethylhexanoate (3GO) and has a glass transition temperature of Tg (° C.) is used for measurement of the viscoelasticity (testing method A), an elasticity G'(Tg+80) at (Tg+80)° C. and an elasticity G'(Tg+30) at (Tg+30)° C. preferably have a ratio (G'(Tg+80)/G'(Tg+30)) of at least 0.65.

Also, when the first layer is used as a resin film B and the viscoelasticity of the resin film B with a glass transition temperature of Tg (° C.) is measured (testing method B), an elasticity G'(Tg+80) at (Tg+80)° C. and an elasticity G'(Tg+30) at (Tg+30)° C. preferably have a ratio (G'(Tg+80)/G'(Tg+30)) of at least 0.65.

In the testing method B, the first layer is used as the resin film B. Namely, the first layer itself is a resin film B.

The resin film B is the first layer. In the case where the resin film B contains the thermoplastic resin, the first plasticizer represented by the formula (1), and another plasticizer different from the first plasticizer, the resin film B contains the other plasticizer at the weight ratio in the first layer. In the testing method B, the elasticity G'(Tg+80) and the elasticity G' (Tg+30) are preferably measured after migration of the plasticizer in the interlayer film for laminated glass. In the testing method B, the elasticity G'(Tg+80) and the elasticity G' (Tg+30) are preferably measured after migration of the plasticizer in the interlayer film for laminated glass during storage of the interlayer film for laminated glass at a humidity of 30% (±3%) and a temperature of 23° C. for a month.

The present inventors have made various studies to suppress bubble formation and bubble growth, and have found that the bubble formation and the bubble growth in a laminated glass can be sufficiently suppressed if the ratio (G'(Tg+80)/G'(Tg+30)) determined by the testing method A or the testing method B is at least 0.65. Even if the total amount of all the plasticizers in the first layer is large, bubble formation and bubble growth in the laminated glass is sufficiently suppressed. The sound insulation of the laminated glass can be therefore increased. Especially, bubble formation and bubble growth in the laminated glass is further suppressed if the used interlayer film for laminated glass in which the second layers are stacked on the both faces of the first layer is constituted to have a ratio (G'(Tg+80)/G'(Tg+30)) of at least 0.65.

The ratio (G'(Tg+80)/G'(Tg+30)) is at least 0.65 and preferably at most 1.0. The ratio (G'(Tg+80)/G'(Tg+30)) of at least 0.65 allows sufficient suppression of bubble formation and bubble growth in the laminated glass even if the laminated glass is stored under severe conditions or for a long time. The ratio (G'(Tg+80)/G'(Tg+30)) of at least the above lower limit and at most the above upper limit allows more efficient suppression of bubble formation and bubble growth in the laminated glass even if the laminated glass is stored under severe conditions or for a long time.

From the standpoint of sufficient increase in the sound insulation of the laminated glass, the total amount of all the plasticizers for 100 parts by weight of the polyvinyl acetal resin in the first layer is preferably at least 40 parts by weight. Even when the amount of the plasticizer in the first layer is large, bubble formation and bubble growth in the laminated glass can be suppressed by the first layer having a configuration that the ratio (G'(Tg+80)/G' (Tg+30)) is at least 0.65.

The glass transition temperature Tg (° C.) represents a peak temperature of the loss factor tan δ obtained from the results of the viscoelasticity measurement. From the standpoint of further suppression of bubble formation and bubble growth in the laminated glass, the ratio (G'(Tg+80)/G'(Tg+30)) is more preferably at least 0.7 and at most 0.95, and more preferably at least 0.75 and at most 0.9. Especially, in the case where the average degree of polymerization of a polyvinyl alcohol resin is utilized to control the ratio (G'(Tg+80)/G'(Tg+30)), since bubble formation and bubble growth in the laminated glass are sufficiently suppressed and the sound insulation of the laminated glass is further increased, the ratio (G'(Tg+80)/G' (Tg+30)) is preferably at least 0.65, more preferably at least 0.66, still more preferably at least 0.67, and preferably at most 0.82 and still more preferably at most 0.8. Moreover, when the ratio (G' (Tg+80)/G'(Tg+30)) is at most 0.82 or at most 0.8, the interlayer film is easily formed.

Exemplary methods for setting the ratio (G'(Tg+80)/G' (Tg+30)) to at least 0.65 by the testing method A or the testing method B include a method of using a polyvinyl alcohol resin that has a comparatively high average degree of polymerization in synthesis of the polyvinyl acetal resin in the first layer, and a method of enhancing the interaction of molecules of the polyvinyl acetal resin in the first layer. Exemplary methods of the method of enhancing the interaction of molecules of the polyvinyl acetal resin in the first layer include physical crosslinking and chemical crosslinking between molecules of the polyvinyl acetal resin. From the standpoint of easy formation of an interlayer film using an extruder, particularly preferable methods are the method of using a polyvinyl alcohol resin that has a comparatively high average degree of polymerization in synthesis of the polyvinyl acetal resin in the first layer and physical crosslinking between molecules of the polyvinyl acetal resin.

Figure 5:
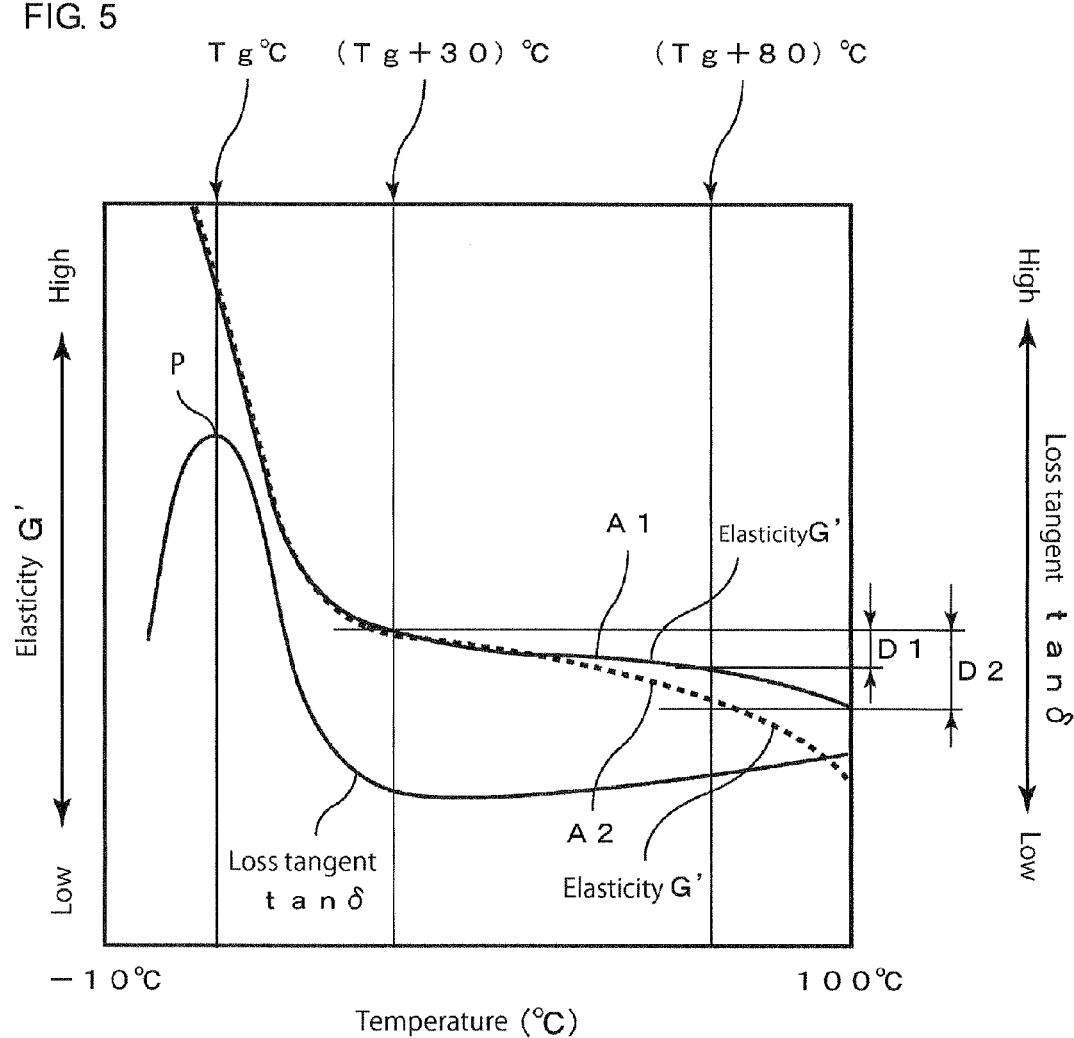
FIG. 5 is a view for illustrating a relation between the loss factor tan δ and the temperature and a relation between the elasticity G' and the temperature in measurement of the viscoelasticity of a resin film containing a polyvinyl acetal resin in the first layer and triethyleneglycol di-2-ethylhexanoate.

A description is given on one example of a relation between the loss factor tan δ obtained in the viscoelasticity measurement and the temperature and a relation between the elasticity G' and the temperature with reference to FIG. 5.

The relation between the loss factor tan δ and the temperature is as illustrated in FIG. 5. The temperature at the peak P of the loss factor tan δ is the glass transition temperature Tg.

The glass transition temperature Tg corresponding to the elasticity G' indicated by a dotted line A2 is the same temperature as the glass transition temperature Tg corresponding to the elasticity G° indicated by a solid line A1 in FIG. 5. For example, a smaller change D in the elasticity G' (Tg+80) relative to the elasticity G' (Tg+30) allows more efficient suppression of bubble formation and bubble growth in the laminated glass. A change D1 in the elasticity G' indicated by the solid line A1 is smaller than a change D2 in the elasticity G' indicated by the dotted line A2. In FIG. 5, therefore, bubble formation and bubble growth in the laminated glass is more efficiently suppressed in the case of the elasticity G' indicated by the solid line A1 which shows the comparatively smaller change D1 than in the case of the elasticity G' indicated by the dotted line A2 which shows the comparatively larger change D2.

The G'(Tg+30) is preferably at least 0.2 million Pa. The G'(Tg+30) is more preferably at least 0.22 million Pa, still more preferably at least 0.23 million Pa, and particularly preferably at least 0.24 million Pa. The G'(Tg+30) is preferably at most 10 million Pa, more preferably at most 5 million Pa, still more preferably at most 1 million Pa, particularly preferably at most 0.5 million Pa, and most preferably 0.3 million Pa. The G'(Tg+30) of at least above lower limit can more efficiently suppress bubble formation and bubble growth in the laminated glass.

The relation between the elasticity G' and the temperature is significantly affected by the kind of the polyvinyl acetal resin. Especially, the relation is greatly affected by the average degree of polymerization of the polyvinyl alcohol resin used for preparation of the polyvinyl acetal resin. The relation is not so much affected by the kind of the plasticizer. Also, the relation is not so much affected by the amount of the plasticizer in normal plasticizer content. The ratio (G'(Tg+80)/G' (Tg+30)) in the case where a plasticizer other than 3GO, such as a monobasic organic ester, or the first plasticizer represented by the formula (1) is used as a plasticizer instead of 3GO, especially the ratio (G'(Tg+80)/G'(Tg+30)) in the case where the first plasticizer represented by the formula (1), triethyleneglycol di-2-ethylbutyrate (3 GH), and triethyleneglycol di-n-heptanoate (3G7) are used is not so different from the ratio (G' (Tg+80)/G' (Tg+30)) in the case where 3GO is used. When the total amount of all the plasticizers for 100 parts by weight of the polyvinyl acetal resin is 50 to 80 parts by weight, the ratios (G'(Tg+80)/G'(Tg+30)) are not so much different from each other. The ratio (G'(Tg+80)/G'(Tg+30)) determined by using a resin film containing 100 parts by weight of a polyvinyl acetal resin and 60 parts by weight of triethyleneglycol di-2-ethylhexanoate (3GO) as a plasticizer is not so much different from the ratio (G'(Tg+80)/G'(Tg+30)) determined by using the first layer itself. The ratios (G'(Tg+80)/G'(Tg+30)) obtained by the testing method A and the testing method B are preferably both at least 0.65. More preferably, the ratio (G'(Tg+80)/G'(Tg+30)) obtained by the testing method B is at least 0.65.

For suppression of bubble formation in the interlayer film for laminated glass, the polyvinyl acetal resin in the first layer is preferably obtained by acetalization of a polyvinyl alcohol resin having an average degree of polymerization of more than 3000. In this case, the ratio (G'(Tg+80)/G'(Tg+30)) is not necessarily at least 0.65, but is preferably at least 0.65. For further suppression of bubble formation and bubble growth in the laminated glass, the total amount of all the plasticizers is preferably at least 40 parts by weight for 100 parts by weight of the polyvinyl acetal resin obtained by acetalization of a polyvinyl alcohol resin having an average degree of polymerization of more than 3000 in the first layer. For further suppression of bubble formation and bubble growth in the laminated glass, the polyvinyl acetal resin obtained by acetalization of a polyvinyl alcohol resin having an average degree of polymerization of more than 3000 preferably has a hydroxyl content of at most 30 mol %.

For further increase in the sound insulation of the laminated glass, the total amount of all the plasticizers for 100 parts by weight of the polyvinyl acetal resin in the first layer is preferably at least 40 parts by weight, more preferably at least 50 parts by weight, still more preferably at least 55 parts by weight, and particularly preferably at least 60 parts by weight. Accordingly, even if the plasticizer content of the first layer is large, bubble formation and bubble growth in the laminated glass is more efficiently suppressed by controlling the hydroxyl content of the polyvinyl acetal resin in each of the first layer and the second layer, by controlling the ratio of the high molecular weight component X having an absolute molecular weight of at least 1 million or the ratio of the high molecular weight component Y having a molecular weight y of at least 1 million, or by controlling the ratio (G'(Tg+80)/ G'(Tg+30)).

Hereinafter, detail descriptions are given on thermoplastic resins such as a polyvinyl acetal resin and plasticizers such as the first plasticizer and the second plasticizer contained in the interlayer film for laminated glass according to the present invention, and other components used in the interlayer film for laminated glass.

(Thermoplastic Resin Contained in the First Layer)

The thermoplastic resin contained in the first layer is not particularly limited, and a conventionally known thermoplastic resins may be used. In the case where the second layer contains a thermoplastic resin, the thermoplastic resin is not particularly limited, and a conventionally known thermoplastic resin may be used. Only one kind of the thermoplastic resin may be used, or two or more thermoplastic resins may be used in combination.

Examples of the thermoplastic resin include polyvinyl acetal resins, ethylene-vinyl acetate copolymer resins, ethylene-acrylic copolymer resins, polyurethane resins, and polyvinyl alcohol resins.

The thermoplastic resin is preferably a polyvinyl acetal resin. A combination use of a polyvinyl acetal resin and a specific first plasticizer further increases the adhesiveness of the interlayer film for laminated glass according to the present invention to a component for laminated glass or the adhesiveness between layers. The thermoplastic resin in the second layer is preferably a polyvinyl acetal resin. In this case, the adhesiveness between the second layer and the component for laminated glass and the adhesiveness of the first layer to the second layer are further increased. In addition, affinity between the first layer and the second layer is increased, so that the transparency of the interlayer film and the laminated glass is further increased. Only one kind of the polyvinyl acetal resin may be used, or two or more polyvinyl acetal resins may be used in combination.

The polyvinyl acetal resin can be produced by acetalization of polyvinyl alcohol with an aldehyde, for example. The polyvinyl alcohol can be produced by saponification of polyvinyl acetate, for example. The saponification degree of the polyvinyl alcohol is commonly within a range of 70 to 99.9 mol %, preferably 75 to 99.8 mol %, and still more preferably 80 to 99.8 mol %.

The polyvinyl alcohol preferably has an average degree of polymerization of at least 200, more preferably at least 500, still more preferably at least 1600, particularly preferably at least 2600, and most preferably at least 2700. The average degree of polymerization is preferably at most 5000, more preferably at most 4000, and still more preferably at most 3500. The average degree of polymerization satisfying the lower limit further increases the penetration resistance of the laminated glass. The average degree of polymerization satisfying the upper limit facilitates formation of the interlayer film.

For inhibition of a sheet slippage of a laminated glass including the interlayer film for laminated glass according to the present invention, the polyvinyl alcohol preferably has an average degree of polymerization of at least 2600 and more preferably at least 2700. The sheet slippage indicates a phenomenon that one glass sheet slides to be dislocated from the other glass sheet due to its weight in the storage of the laminated glass leaning on something in a high temperature environment.

For further increase in the penetration resistance of the laminated glass, the polyvinyl alcohol especially preferably has an average degree of polymerization of 2700 to 5000. In particular, for further increase in the penetration resistance of the laminated glass, the polyvinyl acetal resin in the first layer is preferably obtained by acetalization of polyvinyl alcohol having an average degree of polymerization of 2700 to 5000.

For further suppression of bubble formation and bubble growth in the laminated glass, the polyvinyl alcohol resin used for preparation of the polyvinyl acetal resin in the first layer has the minimum average degree of polymerization of preferably 3010, preferably 3050, preferably 3500, preferably 3600, preferably 4000, and preferably 4050. The maximum average degree of polymerization thereof is preferably 7000, preferably 6000, preferably 5000, preferably 4900, and preferably 4500. In particular, for further suppression of bubble formation and bubble growth in the laminated glass, sufficient increase in the sound insulation of the laminated glass, and easy formation of the interlayer film, the polyvinyl alcohol resin used for preparation of the polyvinyl acetal resin in the first layer preferably has an average degree of polymerization of at least 3010, more preferably at least 3020, preferably at most 4000, more preferably less than 4000, still more preferably at most 3800, particularly preferably at most 3600, and most preferably at most 3500.

The polyvinyl acetal resin in the second layer may be produced by acetalization of a polyvinyl alcohol resin. The polyvinyl alcohol resin used for preparation of the polyvinyl acetal resin in the second layer preferably has the minimum average degree of polymerization of 200, more preferably 500, still more preferably 1000, and particularly preferably 1500. The maximum average degree of polymerization thereof is preferably 4000, more preferably 3500, still more preferably 3000, and particularly preferably 2500. The average degree of polymerization satisfying the preferable lower limit further increases the penetration resistance of the laminated glass. The average degree of polymerization satisfying the preferable upper limit facilitates formation of the interlayer film.

The polyvinyl alcohol resin used for preparation of the polyvinyl acetal resin in the first layer preferably has an average degree of polymerization higher than that of the polyvinyl alcohol resin used for preparation of the polyvinyl acetal resin in the second layer. The difference is preferably at least 500, preferably at least 800, more preferably at least 1000, still more preferably at least 1300, and particularly preferably at least 1800.

The average degree of polymerization of the polyvinyl alcohol is determined by a method in accordance with JIS K 6726 "Testing methods for polyvinyl alcohol".

The carbon number of the acetal group contained in the polyvinyl acetal resin is not particularly limited. The aldehyde used in preparation of the polyvinyl acetal resin is not particularly limited. The carbon number of the acetal group in the polyvinyl acetal resin is preferably 3 or 4. The carbon number of at least 3 sufficiently lowers the glass transition temperature of the interlayer film and further increases the sound insulation for solid born sounds at low temperatures.

The aldehyde is not particularly limited. Commonly, aldehydes having 1 to 10 carbon atom(s) are suitably used. Examples of the aldehydes having 1 to 10 carbon atom(s) include n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde, and benzaldehyde. In particular, propionaldehyde, n-butylaldehyde, isobutylaldehyde, n-hexylaldehyde, or n-valeraldehyde is preferably used. Moreover, propionaldehyde, n-butylaldehyde, or isobutylaldehyde is more preferably used, and n-butylaldehyde is still more preferably used. Each of these aldehydes may be used alone, or two or more of them may be used in combination.

The carbon number of the acetal group in the polyvinyl acetal resin in the second layer is preferably 3 or 4. The carbon number of at least 3 sufficiently lowers the glass transition temperature of the interlayer film and further increases the sound insulation for solid born sounds at low temperatures. The aldehyde used in acetalization is preferably propionaldehyde, n-butylaldehyde, isobutylaldehyde, n-hexylaldehyde, or n-valeraldehyde. More preferably, the aldehyde is propionaldehyde, n-butylaldehyde, or isobutylaldehyde. Still more preferably, the aldehyde is n-butylaldehyde. Each of these aldehydes may be used alone, or two or more of them may be used in combination.

The polyvinyl acetal resin is preferably a polyvinyl butyral resin. The interlayer film for laminated glass according to the present invention preferably contains a polyvinyl butyral resin as the polyvinyl acetal resin in each of the first layer and the second layer. A polyvinyl butyral resin can be easily synthesized. Use of a polyvinyl butyral resin contributes to still more appropriate adhesiveness of the interlayer film to the component for laminated glass. Further, the use leads to a further increase in the properties such as light resistance and weather resistance.

The hydroxyl content (the amount of the hydroxyl group) of the polyvinyl acetal resin in the first layer is at least 0 mol %, preferably at least 10 mol %, more preferably at least 15 mol %, and still more preferably at least 18 mol %. The hydroxyl content is preferably at most 40 mol %, more preferably at most 35 mol %, particularly preferably at most 25 mol %, and most preferably at most 24 mol %. If the hydroxyl content satisfies the lower limit, bleeding of the plasticizer is hardly caused and the moisture resistance of the interlayer is further increased. If the hydroxyl content satisfies the preferable maximum amount, the laminated glass may have further increased penetration resistance. Further, the interlayer film can have higher flexibility, and can therefore show even higher handling properties. For further increase in the sound insulation of the laminated glass in a high frequency area, the lower hydroxyl content of the polyvinyl acetal resin in the first layer is better. The hydroxyl content of the polyvinyl acetal resin in the first layer may be 0 mol %.

Especially, the hydroxyl content of at most 25 mol % in the first layer allows further increase in the moisture resistance of the interlayer film and the laminated glass.

The hydroxyl content of the polyvinyl acetal resin in the second layer is preferably 25 to 40 mol %. The hydroxyl content within this range efficiently increases the penetration resistance of the interlayer film and the laminated glass and improves the handling properties of the interlayer film. The hydroxyl content of the polyvinyl acetal resin in the second layer is more preferably at least 26 mol %, particularly preferably at least 27 mol %, and most preferably at least 30 mol %. The hydroxyl content is preferably at most 37 mol %, particularly preferably at most 34 mol %, and most preferably at most 32 mol %.

For further increase in the sound insulation of the laminated glass, the hydroxyl content of the polyvinyl acetal resin in the first layer is preferably lower than that of the polyvinyl acetal resin in the second layer. For further increase in the sound insulation of the laminated glass, the hydroxyl content of the polyvinyl acetal resin in the first layer is preferably lower than that of the polyvinyl acetal resin in the second layer by at least 1 mol %, more preferably by at least 3 mol %, still more preferably at least 5 mol %, and particularly preferably at least 7 mol %.

The hydroxyl content of the polyvinyl acetal resin is a mole fraction obtained by dividing the amount of ethylene groups to which hydroxyl groups are bonded by the total amount of ethylene groups in the main chain. It is possible to obtain the amount of ethylene groups to which hydroxyl groups are bonded, for example, by measuring the amount of ethylene groups to which hydroxyl groups of polyvinyl alcohol as a raw material are bonded in accordance with JIS K6726 "Testing Methods for Polyvinyl Alcohol".

The polyvinyl acetal resin in the first layer preferably has an acetylation degree (the amount of acetyl groups) of at least 0.1 mol %, more preferably at least 0.3 mol %, still more preferably at least 0.5 mol %, and particularly preferably at least 15 mol %. The acetylation degree is preferably at most 30 mol %, more preferably at most 25 mol %, and still more preferably at most 20 mol %. The acetylation degree satisfying the above lower limit increases the affinity between the polyvinyl acetal resin and the plasticizer. In addition, the glass transition temperature of the polyvinyl acetal resin is sufficiently increased. The acetylation degree satisfying the above upper limit further increases the moisture resistance of the interlayer film and the laminated glass.

The polyvinyl acetal resin in the second layer preferably has an acetylation degree of at least 0 mol % and preferably at least 0.5 mol %. The acetylation degree is preferably at most 10 mol % and more preferably at most 3 mol %. The acetylation degree satisfying the above upper limit enhances the strength of the interlayer film and suppresses bleeding of the plasticizer.

The polyvinyl acetal resin in the second layer preferably has an acetylation degree of at most 3 mol %. The acetylation degree of at most 3 mol % increases the affinity between the polyvinyl acetal resin and the plasticizer. Accordingly, bleeding of the plasticizer is further suppressed.

The polyvinyl acetal resin in the second layer preferably has an acetalization degree (or butyralization degree) of 55 to 75 mol %. The acetalization degree of within this range hardly causes bleeding of the plasticizer. The acetalization degree satisfying the above lower limit increases the moisture resistance of the interlayer film and the laminated glass. The acetalization degree is preferably at least 58 mol %, more preferably at least 60 mol %, and particularly preferably at least 62 mol %. The acetalization degree is preferably at most 72 mol %, more preferably at most 69 mol %, and particularly preferably at most 66 mol %.

The acetylation degree in the first layer is obtained as described below. The amounts of ethylene groups to which acetal groups are bonded and to which hydroxyl groups are bonded are subtracted from the total amount of ethylene groups in the main chain. The obtained value is divided by the total amount of ethylene groups in the main chain. The obtained mole fraction expressed as percent is the acetylation degree. The amount of ethylene groups to which acetal groups are bonded can be measured in accordance with JIS K6728 "Testing Methods for Polyvinyl butyral".

The polyvinyl acetal resin in the first layer preferably has an acetalization degree (butyralization degree in the case of a polyvinyl butyral resin) of at least 60 mol % and more preferably at least 63 mol %. The acetalization degree is preferably at most 85 mol %, more preferably at most 75 mol %, and still more preferably at most 70 mol %. The acetalization degree satisfying the above lower limit increases the affinity between the polyvinyl acetal resin and the plasticizer. The acetalization degree satisfying the above upper limit shortens the reaction time needed for production of the polyvinyl acetal resin.

The acetalization degree is a mole fraction expressed as percent obtained by dividing the amount of ethylene groups to which acetal groups are bonded by the total amount of ethylene groups in the main chain.

It is possible to obtain the acetalization degree by measuring the amount of acetyl groups and the amount of vinyl alcohol in accordance with JIS K6728 "Testing methods for Polyvinyl butyral", calculating the mole fractions based on the measurement results, and subtracting the mole fractions of the amount of acetyl groups and of the amount of vinyl alcohol from 100 mol %.

When a polyvinyl butyral resin is used as the polyvinyl acetal resin, it is possible to obtain the acetalization degree (butiralyzation degree) and the amount of acetyl groups from the measurements in accordance with JIS K6728 "Testing methods for Polyvinyl butyral".

For further increase in the moisture resistance and penetration resistance of the interlayer film and the laminated glass, the acetal group of the polyvinyl acetal resin in the second layer particularly preferably has 3 or 4 carbon atoms, an acetalization degree of 60 to 75 mol %, and an acetylation degree of 0 to 10 mol %. The polyvinyl acetal resin having at least 3 carbon atoms in the second layer sufficiently lowers the glass transition temperature of the interlayer film and further increases the sound insulation for solid born sounds at low temperatures.

For easy control of migration of the plasticizer and further increase in the sound insulation of the laminated glass, the polyvinyl acetal resin (1) in the first layer preferably has an acetylation degree exceeding 8 mol % when the content difference (1-2) is at most 8.5 mol %.

For easy control of migration of the plasticizer and further increase in the sound insulation of the laminated glass, the polyvinyl acetal resin (1) in the first layer preferably has an acetalization degree of at least 68 mol % or a hydroxyl content of less than 31.5 mol % when the content difference (1-2) is exceeding 8.5 mol % and at most 9.2 mol % or the content difference (1-2) is at most 9.2 mol %.

For further suppression of bubble formation and bubble growth in the laminated glass and further increase in the sound insulation of the laminated glass, the polyvinyl acetal resin (1) contained in the first layer is preferably a polyvinyl acetal resin having an acetylation degree of less than 8 mol % (hereinafter, also referred to as "polyvinyl acetal resin A") or a polyvinyl acetal resin having an acetylation degree of at least 8 mol % (hereinafter, also referred to as "polyvinyl acetal resin B").

The polyvinyl acetal resin A has an acetylation degree a of less than 8 mol %, preferably at most 7.5 mol %, preferably at most 7 mol %, preferably at most 6 mol %, and preferably at most 5 mol %. The acetylation degree a is preferably at least 0.1 mol %, preferably at least 0.5 mol %, preferably at least 0.8 mol %, preferably at least 1 mol %, preferably at least 2 mol %, preferably at least 3 mol %, and preferably at least 4 mol %. The acetylation degree a satisfying the above upper limit and lower limit further increases the affinity between the polyvinyl acetal resin and the plasticizer and further increases the sound insulation of the laminated glass.

The polyvinyl acetal resin A preferably has the minimum acetalization degree a of 68 mol %, more preferably 70 mol %, still more preferably 71 mol %, and particularly preferably 72 mol %. The maximum acetalization degree a is preferably 85 mol %, more preferably 83 mol %, still more preferably 81 mol %, and particularly preferably 79 mol %. The acetalization degree a satisfying the lower limit further increases the sound insulation of the laminated glass. The acetalization degree a satisfying the upper limit shortens the reaction time needed for production of the polyvinyl acetal resin A.

The polyvinyl acetal resin A preferably has a hydroxyl content a of at most 30 mol %, preferably at most 27.5 mol %, preferably at most 27 mol %, preferably at most 26 mol %, preferably at most 25 mol %, preferably at most 24 mol %, preferably at most 23 mol %. The hydroxyl content a is preferably at least 16 mol %, preferably at least 18 mol %, preferably at least 19 mol %, and preferably at least 20 mol %. The hydroxyl content a satisfying the upper limit further increases the sound insulation of the laminated glass. The hydroxyl content a satisfying the lower limit further increases the adhesiveness of the interlayer film.

The polyvinyl acetal resin A is preferably a polyvinyl butyral resin.

The polyvinyl acetal resin B preferably has an acetylation degree b of at least 8 mol %, preferably at least 9 mol %, preferably at least 10 mol %, preferably at least 11 mol %, and preferably at least 12 mol %. The acetylation degree b is preferably at most 30 mol %, preferably at most 28 mol %, preferably at most 26 mol %, preferably at most 24 mol %, preferably at most t 20 mol %, and preferably at most 19.5 mol %. The acetylation degree b satisfying the lower limit further increases the sound insulation of the laminated glass. The acetylation degree b satisfying the upper limit shortens the reaction time needed for production of the polyvinyl acetal resin B. In particular, for further shortening of the reaction time needed for production of the polyvinyl acetal resin B, the polyvinyl acetal resin B preferably has an acetylation degree b of less than 20 mol %.

The polyvinyl acetal resin B preferably has the minimum acetalization degree b of 50 mol %, more preferably 52.5 mol %, still more preferably 54 mol %, and particularly preferably 60 mol %. The maximum acetalization degree b is preferably 80 mol %, more preferably 77 mol %, still more preferably 74 mol %, and particularly preferably 71 mol %. The acetalization degree b satisfying the lower limit further increases the sound insulation of the laminated glass. The acetalization degree b satisfying the upper limit shortens the reaction time needed for production of the polyvinyl acetal resin B.

The polyvinyl acetal resin B preferably has a hydroxyl content b of at most 30 mol %, preferably at most 27.5 mol %, preferably at most 27 mol %, preferably at most 26 mol %, and preferably at most 25 mol %. The hydroxyl content b is preferably at least 18 mol %, preferably at least 20 mol %, preferably at least 22 mol %, and preferably at least 23 mol %. The hydroxyl content b satisfying the upper limit further increases the sound insulation of the laminated glass. The hydroxyl content b satisfying the lower limit further increases the adhesiveness of the interlayer film.

The polyvinyl acetal resin B is preferably a polyvinyl butyral resin.

The polyvinyl acetal resin A and the polyvinyl acetal resin B are each preferably obtained by acetalization of a polyvinyl alcohol resin having an average degree of polymerization exceeding 3000 with an aldehyde. The aldehyde preferably has 1 to 10 carbon atom(s), and more preferably 4 or 5 carbon atoms. The polyvinyl alcohol resin preferably has the minimum average degree of polymerization of 3010, preferably 3050, preferably 3500, preferably 3600, preferably 4000, and preferably 4050. The maximum average degree of polymerization is preferably 7000, preferably 6000, preferably 5000, preferably 4900, and preferably 4500. The polyvinyl acetal resin A and the polyvinyl acetal resin B in the first layer are each particularly preferably obtained by acetalization of a polyvinyl alcohol resin having an average degree of polymerization of exceeding 3000 and less than 4000. Especially, for further suppression of bubble formation and bubble growth in the laminated glass, sufficient increase in the sound insulation of the laminated glass, and easy formation of the interlayer film, the polyvinyl alcohol resin used in the production of the polyvinyl acetal resin A and the polyvinyl acetal resin B in the first layer preferably has an average degree of polymerization of at least 3010, more preferably at least 3020, preferably at most 4000, more preferably less than 4000, still more preferably at most 3800, particularly preferably at most 3600, and most preferably at most 3500.

The thermoplastic resin preferably has the minimum weight average molecular weight of 0.1 million and more preferably 0.3 million. The maximum weight average molecular weight is preferably 10 million and more preferably 5 million. The weight average molecular weight of the thermoplastic resin below the preferable lower limit may lower the strength of the interlayer film. The weight average molecular weight of the thermoplastic resin above the preferable upper limit may too much enhance the strength of the interlayer film. The weight average molecular weight is the polystyrene-equivalent molecular weight determined by gel permeation chromatography (GPC).

The weight average molecular weight is the polystyrene-equivalent weight average molecular weight determined by gel permeation chromatography (GPC). For example, the polystyrene-equivalent weight average molecular weight is determined by gel permeation chromatography using polystyrene of known molecular mass as a standard sample. As a polystyrene standard sample ("Shodex Standard SM-105", "Shodex Standard SH-75" produced by SHOWA DENKO K.K.), 14 samples are used which have a weight average molecular weight of 580, 1260, 2960, 5000, 10100, 21000, 28500, 76600, 196000, 630000, 1130000, 2190000, 3150000, and 3900000. The approximation straight line obtained by plotting the molecular weight relative to the elution time indicated by the peak top of the standard sample peak is used as a calibration curve. A surface layer (the second layer) and an intermediate layer (the first layer) are removed from a multilayer interlayer film having been left for a month in a steady temperature and humidity room (humidity of 30% (±3%), temperature 23° C.). The removed first layer (intermediate layer) is dissolved in tetrahydrofuran (THF) to provide a 0.1 wt % solution. The weight average molecular weight of the resulting solution is measured by analysis using a GPC device. The weight average molecular weight is analyzed by using a GPC device ("RI: L2490, Autosampler: L-2200, Pump: L-2130, Column oven: L-2350, Column: series of GL-A120-S and GL-A100MX-S" produced by Hitachi High-Technologies Corporation) connected with a light scattering detector for GPC ("Model 1270 (RALS+VISCO)" produced by VISCOTEK).

(Production method of a thermoplastic resin containing the high molecular weight component X having an absolute molecular weight of at least 1 million or the high molecular weight component Y having a molecular weight y of at least 1 million)

A description is given on a specific production method of a polyvinyl acetal resin containing the high molecular weight component X having an absolute molecular weight of at least 1 million or the high molecular weight component Y having a molecular weight y of at least 1 million as one example of the thermoplastic resin containing the high molecular weight component X having an absolute molecular weight of at least 1 million or the high molecular weight component Y having a molecular weight y of at least 1 million in an amount satisfying the above lower limit.

First, a polyvinyl alcohol is prepared. The polyvinyl alcohol is obtainable, for example, by saponification of polyvinyl acetate. The polyvinyl alcohol has a saponification degree of commonly 70 to 99 mol %, preferably 75 to 99.8 mol %, and more preferably 80 to 99.8 mol %.

The minimum polymerization degree of the polyvinyl alcohol is preferably 200, more preferably 500, still more preferably 1000, and particularly preferably 1500. The maximum polymerization degree thereof is preferably 3000, more preferable 2900, still more preferably 2800, and particularly preferably 2700. If the polymerization degree is too low, the penetration resistance of the laminated glass tends to be lowered. In contrast, if the polymerization degree is too high, the interlayer film may be hardly formed.

Next, the polyvinyl alcohol is reacted with an aldehyde by using a catalyst to be acetalized. In this reaction, a solution containing the polyvinyl alcohol may be used. Examples of the solvent used in the solution containing the polyvinyl alcohol include water.

The production method of the polyvinyl acetal resin contained in the first layer preferably includes the step of reacting a polyvinyl alcohol with an aldehyde with use of a catalyst for acetalization of the polyvinyl alcohol.

The production method of the first layer preferably includes the steps of reacting a polyvinyl alcohol with an aldehyde by using a catalyst so that the polyvinyl alcohol is acetalized to give a polyvinyl acetal resin, and forming the first layer using a mixture containing the resulting polyvinyl acetal resin and a plasticizer. In the step of formation of the first layer or after formation of the first layer, a second layer is stacked on the first layer so that a multilayer interlayer film is obtained. Alternatively, co-extrusion of the first layer and the second layer may be employed to produce a multilayer interlayer film.

The aldehyde is not particularly limited. Commonly, aldehydes having 1 to 10 carbon atom(s) are favorably used. Examples of the aldehydes having 1 to 10 carbon atom(s) include propionaldehyde, n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde, and benzaldehyde. In particular, n-butylaldehyde, n-hexylaldehyde, or n-valeraldehyde is preferable. Moreover, n-butylaldehyde is more preferable. Each of these aldehydes may be used alone, or two or more of these may be used in combination.

For easy production of the polyvinyl acetal resin containing a specific amount of the high molecular weight component X having an absolute molecular weight of at least 1 million or the high molecular weight component Y having a molecular weight y of at least 1 million, a method of adding a crosslinking agent such as a dialdehyde before or in the middle of the acetalization reaction using an aldehyde for crosslinking the main chain of polyvinyl alcohols adjacent to each other may be employed. For other examples, a method of promoting the acetalization reaction between molecules by addition of an excessive amount of aldehyde and a method of adding a polyvinyl alcohol having a high polymerization degree may be indicated. Each of these methods may be used alone, or two or more methods may be employed in combination.

The catalyst is preferably an acid catalyst. Examples of the acid catalyst include nitric acid, hydrochloric acid, sulfuric acid, phosphoric acid, and paratoluene sulfonic acid.

The polystyrene-equivalent molecular weight indicates a molecular weight indicated as the molecular weight of polystyrene determined by gel permeation chromatography (GPC) The proportion (%) of the high molecular weight component Y having the molecular weight y of at least 1 million in the polyvinyl acetal resin is determined as a percentage value of the area of a region corresponding to the molecular weight y of at least 1 million occupying in the peak area detected by a refractive index detector in the measurement of the polystyrene-equivalent molecular weight of the polyvinyl acetal resin by GPC.

The polystyrene-equivalent molecular weight is determined as mentioned below, for example.

The polystyrene-equivalent molecular weight is determined by gel permeation chromatography using polystyrene of known molecular mass as a standard sample. As a polystyrene standard sample ("Shodex Standard SM-105", "Shodex Standard SH-75" produced by SHOWA DENKO K. K.), 14 samples are used which have a weight average molecular weight of 580, 1260, 2960, 5000, 10100, 21000, 28500, 76600, 196000, 630000, 1130000, 2190000, 3150000, and 3900000.

The approximation straight line obtained by plotting the weight average molecular weight relative to the elution time indicated by the peak top of the standard sample peak is used as a calibration curve. For example, in the case where the proportion (%) of the high molecular weight component Y having the molecular weight y of at least 1 million occupying in the polyvinyl acetal resin in an intermediate layer of a multilayer interlayer film in which a surface layer, an intermediate layer, and a surface layer are stacked in the stated order, the surface layer and the intermediate layer are removed from the multilayer interlayer film having been left for a month in a steady temperature and humidity room (humidity of 30% (±3%), temperature of 23° C.). The removed intermediate layer is dissolved in tetrahydrofuran (THF) to provide a 0.1 wt % solution. The peak area of the polyvinyl acetal resin in the intermediate layer is measured by analysis of the resulting solution using a GPC device. Next, the area is calculated which corresponds to the region where the polystyrene-equivalent molecular weight of the polyvinyl acetal resin in the intermediate layer is at least 1 million, based on the elution time of the polyvinyl acetal resin in the intermediate layer and the calibration curve. The area of the region where the polystyrene-equivalent molecular weight of the polyvinyl acetal resin in the intermediate layer is at least 1 million is divided by the peak area of the polyvinyl acetal resin in the intermediate layer, and the obtained value is expressed as a percentage value. In this manner, the proportion (%) of the high molecular weight component Y occupying in the polyvinyl acetal resin is calculated. For example, the polystyrene-equivalent molecular weight is determined by using a Gel Permeation Chromatography (GPC) device ("RI: L2490, Autosampler: L-2200, Pump: L-2130, Column oven: L-2350, Column: series of GL-A120-S and GL-A100MX-S" produced by Hitachi High-Technologies Corporation).

(Plasticizer Contained in the First Layer and the Second Layer)

The first plasticizer contains the first plasticizer represented by the formula (1). The first layer preferably contains the second plasticizer that is a diester compound. The second layer preferably contains a plasticizer. The second layer may contain the first plasticizer represented by the formula (1). The second layer preferably contains the second plasticizer that is a diester compound. With regard to the first plasticizer and the second plasticizer, respectively, only one kind of a plasticizer may be used or two or more kinds of plasticizers may be used in combination.

[Chem. 8]

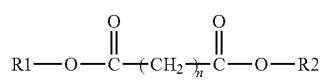

Formula (1)

In the formula (1), R1 and R2 each represent an organic group having at least one ether bond, and n represents an integer of 2 to 8.

From the standpoint of further increase in the sound insulation of the interlayer film and the laminated glass, R1 and R2 in the formula (1) each preferably have at least one ether bond structural unit represented by the formula (11) or (12)

[Chem. 9]

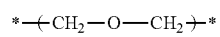

Formula (11)

[Chem. 10]

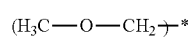

Formula (12)

From the standpoint of further increase in the sound insulation of the interlayer film and the laminated glass, R1 is preferably a group represented by the formula (21) and R2 is preferably a group represented by the formula (26) in the formula (1)

[Chem. 11]

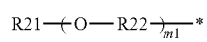

Formula (21)

In the formula (21), R21 represents an alkyl group having 1 to 10 carbon atom(s), R22 represents an alkylene group having 1 to 10 carbon atom(s), and m1 represents an integer of 1 to 5. In the formula (21), the minimum carbon number of R21 is preferably 2, more preferably 3, and still more preferably 4. The maximum carbon number thereof is preferably 9, more preferably 8, still more preferably 7, and particularly preferably 6. In the formula (21), the minimum carbon number of R22 is preferably 2, more preferably 3, and still more preferably 4. The maximum carbon number thereof is preferably 9, more preferably 8, still more preferably 7, and particularly preferably 6.

[Chem. 12]

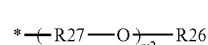

Formula (26)

In the formula (26), R26 represents an alkyl group having 1 to 10 carbon atom(s), R27 represents an alkylene group having 1 to 10 carbon atom(s), and m2 represents an integer of 1 to 5. In the formula (26), the minimum carbon number of R27 is preferably 2, more preferably 3 and still more preferably 4. The maximum carbon number thereof is preferably 9, more preferably 8, still more preferably 7, and particularly preferably 6. In the formula (26), the minimum carbon number of R27 is preferably 2, more preferably 3, and still more preferably 4. The maximum carbon number thereof is preferably 9, more preferably 8, still more preferably 7, and particularly preferably 6.

Namely, the first plasticizer represented by the formula (1) is preferably a first plasticizer represented by the formula (1A).

[Chem. 13]

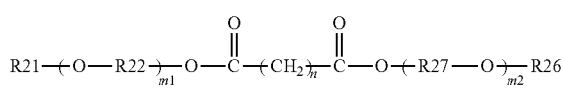

Formula (1A)

In the formula (1A), R21 and R26 each represent an alkyl group having 1 to 10 carbon atom(s), R22 and R27 each represent an alkylene group having 1 to 10 carbon atom (s), m1 and m2 each represent an integer of 1 to 5, and n represents an integer of 2 to 8.

Specific examples of R1 and R2 include a 2-butoxyethyl group, a 2-(2-butoxyethoxy)ethyl group, and a 2-[2-(2-butoxyethoxy)ethoxy]ethyl group. It is to be noted that R1 and R2 each may be a group other than these examples.

The second layer preferably contains a plasticizer. The plasticizer contained in the second layer is not particularly limited. A conventionally known plasticizer may be used as the plasticizer. In the second layer, only one kind of a plasticizer may be used or two or more plasticizers may be used in combination.

Examples of the plasticizer contained in the second layer include organic ester plasticizers such as a monobasic organic acid ester and a polybasic organic acid ester, and phosphate plasticizers such as an organic phosphate plasticizer and an organic phosphite acid plasticizer. Among these, an organic ester plasticizer is preferable. The plasticizer is preferably a liquid plasticizer.

Examples of the monobasic organic acid ester include, but not particularly limited to, a glycol ester obtained through the reaction of glycol and a monobasic organic acid, and an ester of a monobasic organic acid and one of triethylene glycol and tripropylene glycol. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octyl acid, 2-ethylhexyl acid, n-nonylic acid, and decylic acid.

Examples of the monobasic organic acid ester include, but not particularly limited to, a glycol ester obtained through the reaction of glycol and a monobasic organic acid, and an ester of a monobasic organic acid and one of triethylene glycol and tripropylene glycol. Examples of the glycol include triethylene glycol, tetraethylene glycol, and tripropylene glycol. Examples of the monobasic organic acid include butyric acid, isobutyric acid, caproic acid, 2-ethylbutyric acid, heptylic acid, n-octyl acid, 2-ethylhexyl acid, n-nonylic acid, and decylic acid.

Examples of the polybasic organic acid ester include, but not particularly limited to, ester compounds of a polybasic organic acid and a C4 to C8 linear- or branched alcohol. Examples of the polybasic organic acid include adipic acid, sebacic acid, and azelaic acid.

From the standpoint of further increase in the moisture resistance and the penetration resistance of the interlayer film and the laminated glass, the first layer preferably further contains the second plasticizer that is a diester compound, in addition to the first plasticizer represented by the formula (1).

From the standpoint of further increase in the moisture resistance and the penetration resistance of the interlayer film and the laminated glass, the plasticizer contained in the second layer is preferably the second plasticizer that is a diester compound. In the case where both the first layer and the second layer contain the second plasticizers that are diester compounds, the second plasticizers in the first layer and the second layer may be the same as or different from each other.

A conventionally known diester compound used in the interlayer film for laminated glass may be used as the second plasticizer that is a diester compound. The second plasticizer that is a diester compound is preferably a second plasticizer represented by the formula (51). The first layer preferably contains the second plasticizer represented by the formula (51). The second layer preferably contains the second plasticizer represented by the formula (51).

[Chem. 14]

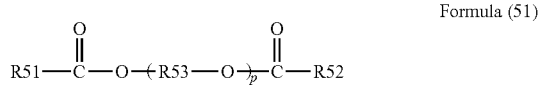

Formula (51)

In the formula (51), R51 and R52 each represent an organic group having 5 to 10 carbon atoms, R53 represents an ethylene group, isopropylene group or n-propylene group, and p represents an integer of 3 to 10.

Specific examples of the second plasticizer include triethyleneglycol di-2-ethylbutylate (3 GH), triethyleneglycol di-2-ethylhexanoate (3GO), triethyleneglycol di-n-heptanoate (3G7), triethyleneglycol dicaprylate, triethyleneglycol di-n-octanoate, tetraethyleneglycol di-2-ethylbutyrate, tetraethyleneglycol di-n-heptanoate, tetraethyleneglycol di-2-ethylhexanoate, pentaethyleneglycol di-2-ethylhexanoate, octaethyleneglycol di-2-ethylhexanoate, nonaethyleneglycol di-2-ethylhexanoate, decaethyleneglycol di-2-ethylhexanoate, tetraethyleneglycol di-n-heptanoate, and tetraethyleneglycol di-n-octanoate.

From the standpoint of further increase in the penetration resistance of the interlayer film and the laminated glass, the second plasticizer is preferably one selected from the group consisting of triethylene glycol di-2-ethylbutyrate (3 GH), triethylene glycol di-2-ethylhexanoate (3GO) and triethylene glycol di-n-heptanoate (3G7), and more preferably triethylene glycol di-2-ethylhexanoate. Use of these preferable plasticizers can further increase the sound insulation of the laminated glass. In addition, the moisture resistance and the penetration resistance of the interlayer film and the laminated glass are also increased.

In the first layer, the amount of the first plasticizer is preferably within 5 to 60 parts by weight. The amount of the first plasticizer for 100 parts by weight of the thermoplastic resin is more preferably at least 10 parts by weight and still more preferably at least 15 parts by weight. The amount of the first plasticizer is more preferably at most 55 parts by weight and still more preferably at most 50 parts by weight. The amount of the first plasticizer which satisfies the above lower limit further increases the sound insulation of the interlayer film and the laminated glass. The amount of the first plasticizer which satisfies the above upper limit hardly causes bleeding of the plasticizer and further increases the moisture resistance and the penetration resistance of the interlayer film and the laminated glass.

In the case where the first layer contains the first plasticizer and the second plasticizer, the total amount of the first plasticizer and the second plasticizer for 100 parts by weight of the thermoplastic resin is preferably within 50 to 80 parts by weight in the first layer. The total amount of the first plasticizer and the second plasticizer for 100 parts by weight of the thermoplastic resin is preferably at least 55 parts by weight and more preferably at least 60 parts by weight. The total amount of the first plasticizer and the second plasticizer is preferably at most 75 parts by weight and more preferably at most 70 parts by weight. The total amount of the first plasticizer and the second plasticizer satisfying the above lower limit further increases the sound insulation of the interlayer film and the laminated glass. The total amount of the first plasticizer and the second plasticizer satisfying the above upper limit hardly causes bleeding of the plasticizer and further increases the moisture resistance and the penetration resistance of the interlayer film and the laminated glass.

In the case where the first layer contains the first plasticizer and the second plasticizer, the first layer preferably contains the first plasticizer and the second plasticizer at a weight ratio (first plasticizer:second plasticizer) of 0.1:9.9 to 9.9:0.1, more preferably 1:9 to 8.5:1.5, particularly preferably 1:9 to 7:3, and most preferably 3:7 to 6:4. A comparatively larger amount of the first plasticizer and a comparatively smaller amount of the second plasticizer further increase the sound insulation of the interlayer film and the laminated glass. A comparatively smaller amount of the first plasticizer and a comparatively larger amount of the second plasticizer further increases the moisture resistance and the penetration resistance of the interlayer film and the laminate glass.

In the second layer, the amount of the plasticizer (the amount of the second plasticizer in the case where the plasticizer is the second plasticizer that is a diester compound) is preferably within 20 to 60 parts by weight for 100 parts by weight of the thermoplastic resin. The amount of the plasticizer is more preferably at least 25 parts by weight and still more preferably 30 parts by weight for 100 parts by weight of the thermoplastic resin. The amount of the plasticizer is more preferably at most 50 parts by weight and still more preferably at most 45 parts by weight for 100 parts by weight of the thermoplastic resin. The amount of the plasticizer which satisfies the above lower limit further increases the penetration resistance of the interlayer film and the laminated glass. The amount of the plasticizer which satisfies the above upper limit hardly causes bleeding of the plasticizer and further increases the transparency of the interlayer film and the laminated glass.

(Other Components)

The first layer and the second layer each may optionally contain additives such as an ultraviolet absorbent, an antioxidant, a light stabilizer, a flame retardant, an antistatic agent, a pigment, a dye, an adhesion regulator, a moisture resistant agent, a fluorescent bleach, and an infrared absorbent. Each of these additives may be used alone, or two or more additives may be used in combination.

(Interlayer Film for Laminated Glass)

The interlayer film for laminated glass and the first layer according to the present invention each exert excellent sound insulation so as to be used as the sound insulation layer in the laminated glass.

A temperature T1 indicating the maximum value of tan δ of the first layer at a frequency of 1 Hz is preferably within −30° C. to 0° C. In this case, the sound insulation of the interlayer film and the laminated glass at low temperatures is further increased. The temperature T1 indicating the maximum value of tan δ means the temperature indicating the maximum value of the obtained loss factor.

A temperature T2 indicating the maximum value of tan δ of the second layer at a frequency of 1 Hz is preferably higher than the temperature T1 and more preferably within 0° C. to 40° C. The temperature T2 higher than the temperature T1 further increases the sound insulation for solid born sound not only at low temperatures but also in a 0° C. to 40° C. environment. Also, the temperature T2 within 0° C. to 40° C. increases the sound insulation for solid born sound in an ordinary temperature range. The ordinary temperature range means 5° C. to 35° C. The temperature T2 is more preferably higher than 0° C., still more preferably at least 3° C., and particularly preferably at most 39° C.

In the case of a multilayer interlayer film for laminated glass having a multilayer structure including at least 2 layers, the first layer preferably has a thickness of 0.02 to 1.8 mm. The thickness is more preferably at least 0.05 mm and at most 0.5 mm. Such a favorable thickness does not make the multilayer interlayer film too thick and further increases the sound insulation of the multilayer interlayer film and the laminated glass.

In the case of a multilayer interlayer film for laminated glass having a multilayer structure including at least 2 layers, the second layer preferably has a thickness of 0.1 to 1 mm. The thickness is more preferably at least 0.2 mm and at most 0.5 mm. The second layer having a thickness satisfying the above lower and upper limits does not make the multilayer interlayer film too thick and further increases the sound insulation of the multilayer interlayer film and the laminated glass. In addition, bleeding of the plasticizer is suppressed.

In the case of a monolayer interlayer film for laminated glass having a monolayer structure, the interlayer film for laminated glass according to the present invention preferably has a thickness (thickness of the first layer) of 0.1 to 3 mm. The thickness (thickness of the first layer) of the interlayer film is more preferably at least 0.25 mm and at most 1.5 mm. The thickness of the interlayer film satisfying the above lower limit sufficiently increases the penetration resistance of the interlayer film and the laminated glass. The thickness of the interlayer film satisfying the above upper limit further increases the transparency of the interlayer film.

In the case where the interlayer film has a multilayer structure including at least 2 layers, a smaller ratio of the thickness of the first layer to the thickness of the interlayer film ((thickness of the first layer)/(thickness of the interlayer film)) and a larger total amount of all the plasticizers contained in the first layer tend to allow bubble formation and bubble growth in the laminated glass. Especially, the ratio in the interlayer film is preferably at least 0.05 and at most 0.35. In this case, even with a large total amount of all the plasticizers for 100 parts by weight of the polyvinyl acetal resin in the first layer, bubble formation and bubble growth in the laminated glass are sufficiently suppressed and the sound insulation of the laminated glass is further increased. The ratio ((thickness of the first layer)/(thickness of the interlayer film)) is preferably at least 0.06, more preferably at least 0.07, still more preferably at least 0.08, and particularly preferably at least 0.1. The ratio is preferably at most 0.3, more preferably at most 0.25, still more preferably at most 0.2, and particularly preferably 0.15.

A method for producing the interlayer film for laminated glass according to the present invention is not particularly limited and a conventionally known method may be employed. For example, the thermoplastic resin, plasticizers such as the first plasticizer and the second plasticizer, and, optionally, other additives may be mixed and kneaded. Then an interlayer film may be formed using the kneaded product. Extrusion molding is preferably employed as it is suitable for continuous production.

Examples of the kneading method include, but not particularly limited to, a method using an extruder, plastograph, kneader, Banbury mixer, calender roll, or the like. In particular, an extruder is preferably used and a twin screw extruder is more preferably used because it is suitable for continuous production.

In the case where one second layer is stacked on each face of the first layer, both the second layers preferably contain the same polyvinyl acetal resins, more preferably the same polyvinyl acetal resins and the same plasticizers because the production efficiency of the interlayer film is enhanced. Moreover, both the second layers are still more preferably formed of the same resin compositions.

(Laminated Glass)

Figure 3:
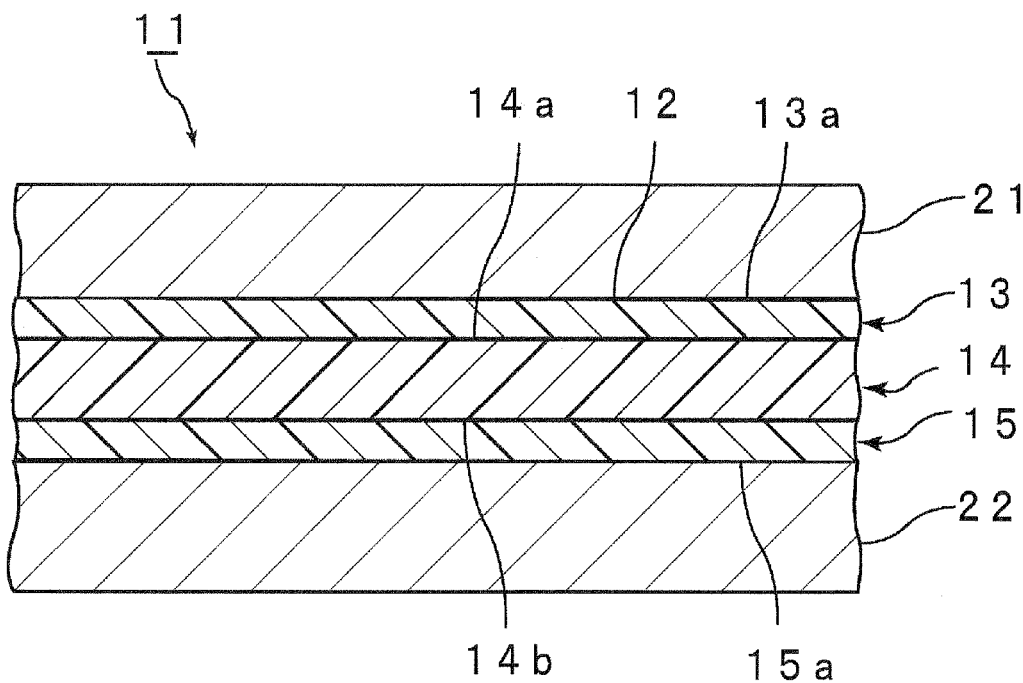
FIG. 3 is a partially notched cross-sectional view schematically illustrating one example of a laminated glass including the interlayer film for laminated glass illustrated in FIG. 1.

FIG. 3 is a cross-sectional view illustrating an exemplary laminated glass using an interlayer film for laminated glass 12 according to one embodiment of the present invention.

A laminated glass 11 illustrated in FIG. 3 has an interlayer film 12 in which a second layer 13, a first layer 14, and a second layer 15 are stacked in the stated order, a first component for laminated glass 21 and a second component for laminated glass 22. The interlayer film 12 is sandwiched between the first component for laminated glass 21 and the second component for laminated glass 22. The first component for laminated glass 21 is stacked on an outer face 13a of the second layer 13. The second component for laminated glass 22 is stacked on an outer face 15a of the second layer 15.

Figure 4:
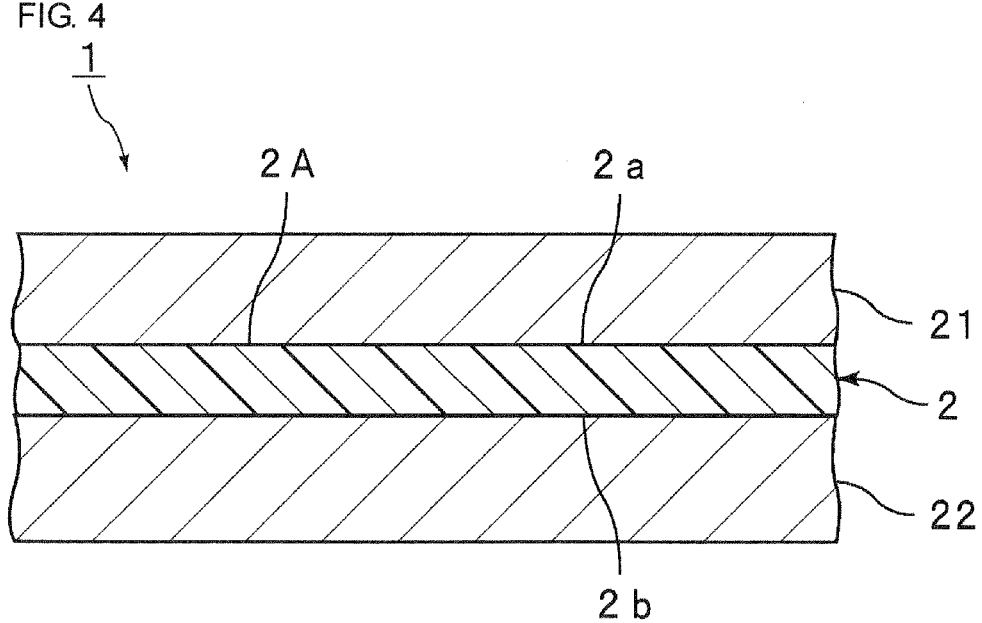
FIG. 4 is a partially notched cross-sectional view schematically illustrating one example of a laminated glass including the interlayer film for laminated glass illustrated in FIG. 2.

FIG. 4 is a cross-sectional view illustrating one example of a laminated glass including an interlayer film 2A for laminated glass according to a second embodiment of the present invention.

A laminated glass 1 in FIG. 4 is provided with the interlayer film 2A (first layer 2), the first component for laminated glass 21 and the second component for laminated glass 22. The interlayer film 2A is a monolayer interlayer film and is the first layer 2. The interlayer film 2A is sandwiched between the first component for laminated glass 21 and the second component for laminated glass 22. The first component for laminated glass 21 is stacked on one face 2a of the interlayer film 2A. The second component for laminated glass 22 is stacked on the other face 2b of the interlayer film 2.

Accordingly, the laminated glass according to the present invention has a first component for laminated glass, a second component for laminated glass, and an interlayer film sandwiched between the first component for laminated glass and the second component for laminated glass. The interlayer film used here is the interlayer film for laminated glass of the present invention.

Examples of the first component for laminated glass 21 and the second component for laminated glass 22 include glass sheets and PET (polyethylene terephthalate) films. The laminated glass 11 encompasses not only a laminated glass having an interlayer film sandwiched between two glass sheets but also a laminated glass having an interlayer film sandwiched between a glass sheet and a PET film. The laminated glass 11 is a laminated product provided with glass sheet (s) preferably including at least one glass sheet.

Examples of the glass sheet include inorganic glass and organic glass. Examples of the inorganic glass include float plate glass, heat absorbing plate glass, heat reflecting glass, polished plate glass, molded plate glass, wire plate glass, lined plate glass, and green glass. The organic glass is a synthetic resin glass substituted for inorganic glass. Examples of the organic glass include polycarbonate plates and poly(meth)acrylic resin plates. Examples of the poly (meth)acrylic resin plate include polymethyl(meth)acrylate plates.

The thickness of each of the first component for laminated glass 21 and the second component for laminated glass 22 is preferably 1 to 5 mm. In the case where the first component for laminated glass 21 and the second component for laminated glass 22 are glass sheets, the thickness thereof is also preferably 1 to 5 mm. If the first component for laminated glass 21 or the second component for laminated glass 22 is PET film, the thickness thereof is preferably 0.03 to 0.5 mm.

The method of producing the laminated glass 1 and the laminated glass 11 are not particularly limited. For example, the interlayer film 2A or the multilayer interlayer film 12 is sandwiched between the first component for laminated glass 21 and the second component for laminated glass 22. The air remaining between the interlayer film 2A or the multilayer interlayer film 12 and the first component for laminated glass 21 and the second component for laminated glass 22 is removed by pressing the resulting product with pressure rollers, or by putting the product in a rubber bag for vacuum-sucking. Then, the product is pre-bonded at about 70° C. to 110° C. to give a laminate. Next, the laminate is put into an autoclave or is pressed, so as to be pressure-bonded with a pressure of 1 to 1.5 MPa at about 120° C. to 150° C. Thus, the laminated glass 1 or the laminated glass 11 can be obtained.

The laminated glass 1 and the laminated glass 11 can be widely used for cars, rail cars, aircrafts, vessels, buildings, and the like. The laminated glass can be used in applications other than these uses. The laminated glass 1 and the laminated glass 11 are preferably used as laminated glasses for buildings or vehicles, and more preferably used as laminated glasses for vehicles. The laminated glass 1 and the laminated glass 11 can be used for windshields, side glass, rear glass, and roof glass of cars.

Hereinafter, the present invention will be described in more detail based on examples. The present invention is not limited to these examples.

The following first plasticizer and the following second plasticizer are used in examples and comparative examples.

First Plasticizer:

Bis(2-butoxyethyl) adipate (corresponding to the first plasticizer represented by the formula (1A) wherein R21 and R26 each represent a n-butyl group, R22 and R27 each represent an ethylene group, and m1 and m2 each represent 1, and n represents 4).

Bis[2-(2-butoxyethoxy)ethyl]adipate (corresponding to the first plasticizer represented by the formula (1A) wherein R21 and R26 each represent a n-butyl group, R22 and R27 each represent an ethylene group, and m1 and m2 each represent 2, and n represents 4).

Second Plasticizer:

Triethyleneglycol di-2-ethylhexanoate (3GO)

The following polyvinyl acetal resin A was synthesized.

Synthesis 1

Synthesis of a Polyvinyl Acetal Resin A:

A reaction vessel provided with a stirrer was charged with ion-exchange water (2700 ml), polyvinyl alcohol (300 g, average degree of polymerization: 3000, saponification degree: 87.2 mol %). The mixture was molten by heating with stirring to give a solution. To the solution, 35 wt % hydrochloric acid was added as a catalyst to a HCl concentration of 0.6 wt %. After adjustment of the temperature to 15° C., n-butylaldehyde (14.2 g) was added to the solution with stirring. Then, n-butylaldehyde (170 g) was added to cause precipitation of a polyvinyl butyral resin in the shape of white particles. In 15 minutes after the precipitation, 35 wt % hydrochloric acid was added to a HCl concentration of 3.9 wt %. The solution was heated to 45° C. and aged for three hours at 45° C. The solution was then cooled and neutralized. The polyvinyl butyral resin was washed with water and dried to give a polyvinyl butyral resin A.

The proportion of the high molecular weight component X (polyvinyl butyral resin) having an absolute molecular weight of at least 1 million occupying in the resulting polyvinyl butyral resin A was 14.5%. The proportion of the high molecular weight component Y (polyvinyl butyral resin) having a molecular weight y of at least 1 million occupying in the resulting polyvinyl butyral resin A was 18.2%. The hydroxyl content was 22.5 mol %. The acetylation degree was 12.8 mol %. The butyralization degree was 64.7 mol %.

EXAMPLE 1

To the polyvinyl butyral resin A (100 parts by weight, carbon number of the acetal group: 4, average degree of polymerization: 3000, hydroxyl content: 22.5 mol %, acetylation degree: 12.8 mol %, butyralization degree: 64.7 mol %) obtained in Synthesis 1 was added bis(2-butoxyethyl) adipate (50 parts by weight) as the first plasticizer. The mixture was sufficiently kneaded with a mixing roll, so that a composition for a first layer was obtained. The polyvinyl butyral resin used was a polyvinyl butyral resin acetalized with n-butylaldehyde.

The resulting composition for a first layer was sandwiched between two fluororesin sheets via 0.1 mm-thick clearance plates. The laminate was press-molded at 150° C. to give an interlayer film B1 (first layer) having a thickness of 0.1 mm.

To the polyvinyl butyral resin A (100 parts by weight, carbon number of the acetal group: 4, average degree of polymerization: 3000, hydroxyl content: 30.5 mol %, acetylation degree: 1 mol %, butyralization degree: 68.5 mol %) was added triethylene glycol di-2-ethylhexanoate (40 parts by weight). The mixture was sufficiently kneaded with a mixing roll, so that a composition for a second layer was obtained. The polyvinyl butyral resin used was a polyvinyl butyral resin acetalized by n-butylaldehyde.

The resulting composition for a second layer was sandwiched between two fluororesin sheets via 0.35 mm-thick clearance plates. The laminate was press-molded at 150° C. to give an interlayer film B2 (second layer) having a thickness of 0.35 mm.

An interlayer film B2, an interlayer film B1, and an interlayer film B2 were stacked in the stated order to give a laminate having a multilayer structure of Second layer/First layer/Second layer. The resulting laminate was sandwiched between two fluorororesin sheets via 0.8 mm-thick clearance plates. The laminated was press-molded at 150° C. to give a multilayer interlayer film B having a thickness of 0.8 mm.

EXAMPLES 2 to 8

The interlayer films B1 and B2 were produced in the same manner as in Example 1 using compositions for first and second layers prepared from polyvinyl butyral resins and plasticizers shown in Tables 1 and 2. Using the interlayer films B1 and B2, multilayer interlayer films B were obtained. Polyvinyl acetal resins used were polyvinyl acetal resins acetalized by n-butylaldehyde. In each of Examples 2, and 6 to 8, the polyvinyl acetal resin used for the first layer was the polyvinyl acetal resin A obtained in Synthesis 1.

COMPARATIVE EXAMPLE 1

To the polyvinyl butyral resin A (100 parts by weight, carbon number of the acetal group: 4, average degree of polymerization: 3000, hydroxyl content: 22.5 mol %, acetylation degree: 12.8 mol %, butyralization degree: 64.7 mol %) obtained in Synthesis 1 was added bis(2-butoxyethyl)adipate (50 parts by weight) as the first plasticizer. The mixture was sufficiently kneaded with a mixing roll, so that a composition was obtained. The polyvinyl butyral resin used was a polyvinyl butyral resin acetalized by n-butylaldehyde.

The resulting composition was sandwiched between two fluororesin sheets via 0.8 mm-thick clearance plates. The composition was press-molded at 150° C. to give an interlayer film A having a thickness of 0.8 mm.

COMPARATIVE EXAMPLE 2

The interlayer films B1 and B2 were produced in the same manner as in Example 1 except that the kind and amount of the plasticizer in the composition for a first layer were changes in accordance with Table 2. Using the interlayer films B1 and B2, the multilayer interlayer film B was obtained. The polyvinyl acetal resin used for the first layer in Comparative Example 2 was the polyvinyl butyral resin A obtained in Synthesis 1.

Evaluation of Examples 1 to 8 and Comparative Examples 1 and 2

The interlayer films and the polyvinyl acetal resins used in the interlayer film of Examples 1 to 8 and Comparative Examples 1 and 2 were evaluated for the following items (1) to (5) or (1) to (6). Examples 1 to 4 and 6 to 8 and Comparative Examples 2 were evaluated also for the following items (7) and (8).

(1) Sound Insulation: Temperatures T1 and T2 Each Indicating the Maximum Value of tan δ at a Frequency of 1 Hz Interlayer films B1-2 were obtained in the same manner as preparation of the interlayer films B1 of Examples 1 to 8 and Comparative Example 2, except that the thickness was changed to 0.8 mm for measurement of the temperature indicating the maximum value of tan δ at a frequency of 1 Hz. Interlayer films B2-2 were obtained in the same manner as preparation of the interlayer films B2 of Examples 1 to 8 and Comparative Example 2, except that the thickness was changed to 0.8 mm. The obtained interlayer films B1-2 and B2-2 were each cut into a circular shape having a diameter of 8 mm as an evaluation sample.

Each evaluation sample of the interlayer film B1-2 was examined for the dispersion of dynamic viscoelasticity with temperature under the conditions of a strain of 1.0%, frequency of 1 Hz, and heating rate of 3° C./min with use of a viscoelasticity measuring device ("ARES" produced by Rheometrics) by a shearing method. Accordingly, the temperature T1 indicating the maximum value of tan δ at a frequency of 1 Hz was obtained. Each evaluation sample of the interlayer film B2-2 was examined for the dynamic viscoelasticity by the above method so that the temperature T2 indicating the maximum value of tan δ at a frequency of 1 Hz was obtained.

The interlayer film A of Comparative Example 1 was cut into a circular shape having a diameter of 8 mm as an evaluation sample. The evaluation sample was examined for the dynamic viscoelasticity by the above method so that the temperature T1 indicating the maximum value of tan δ at a frequency of 1 Hz was obtained.

(2) Sound Insulation: Loss Factor

The interlayer film A or the multilayer interlayer film B was cut into a size of 30 mm length×320 mm width. The interlayer film A or the multilayer interlayer film B was sandwiched between two transparent float glass sheets (25 mm length×305 mm width×2.0 mm thickness). The resulting product was held in a vacuum laminator at 90° C. for 30 minutes for vacuum press to give a laminate. In the laminate, the interlayer film A or the multilayer interlayer film B protruding from the glass sheets was trimmed so that the evaluation sample was prepared. The loss factor of the evaluation sample was determined using a measuring device "SA-01" (produced by R10N Co., Ltd.) at 20° C. by the center excitation method. The loss factor in a primary mode (around 1000 Hz) of resonant frequencies of the obtained loss factor was evaluated.

(3) Slippage

The obtained interlayer film A or the multilayer interlayer film B was cut into a size of 150 mm length×300 mm width. The interlayer film A or the multilayer interlayer film B was sandwiched between two transparent float glass sheets (150 mm length×300 mm width×2.0 mm thickness). The resulting product was held in a vacuum laminator at 90° C. for 30 minutes for vacuum press to give an evaluation sample. One face of the evaluation sample was fixed to a vertical plane and a float glass (150 mm length×300 mm width×15 mm thickness) was attached to the other face with a double-faced adhesive tape. A reference line was drawn on the side face of the laminated glass for measurement of the slippage. The laminated glass was left at 80° C. for 30 days. Then, the slippage of two glass sheets of the evaluation sample was measured.

(4) Evaluation on Bleeding

On the surface of the interlayer film A or the multilayer interlayer film B, five lines (8 cm length) were drawn with a red oil-based ink for marking. The marked interlayer film A or multilayer interlayer film B was placed to have its main surface positioned in a plane that is in parallel with the vertical direction. The marked interlayer film A or multilayer interlayer film B was left for 2 to 4 weeks under steady temperature and humidity conditions of 23° C. and a relative humidity of 28%. The resulting interlayer film A or multilayer interlayer film B was visually observed to check if bleeding or dripping of the permanent marker is present, and evaluated based on the following criteria.

[Evaluation Criteria of Moisture Resistance]

∘∘: No bleeding and no dripping was found in any of 5 lines after 4-week storage ∘: No bleeding and no dripping was found in any of 5 lines after 3-week storage, and bleeding or dripping was found in at least one of 5 lines after 4-week storage Δ: No bleeding and no dripping was found in any of 5 lines after 2-week storage, and bleeding or dripping was found in at least one of 5 lines after 3-week storage x: Bleeding or dripping was found in at least one of 5 lines after 2-week storage (5) Penetration Resistance The obtained interlayer film A or the multilayer interlayer film B was cut into a size of 300 mm length×300 mm width. The interlayer film A or multilayer interlayer film B was held for 24 hours under steady temperature and humidity conditions of 23° C. and a relative humidity of 28%. Then the interlayer film A or multilayer interlayer film B was then sandwiched between two transparent float glass sheets (300 mm length×300 mm width×2.5 mm thickness, clear glass) to give a laminate. The resulting laminate was temporarily bonded by using a heating roller at 230° C. The temporarily-bonded laminate was bonded by using an autoclave under the conditions of 135° C. and a pressure of 1.2 MPa for 20 minutes to give a laminated glass.

The surface temperature of sheets of the obtained laminated glass (300 mm length×300 mm width) used for the penetration resistance test was adjusted to 23° C. Subsequently, according to JIS R 3212, a rigid sphere having a mass of 2260 g and a diameter of 82 mm was dropped from a height of 4 m on the center of each of six sheets of the laminated glass. The laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. In the case of four sheets, another six sheets of the laminated glass were tested again on the penetration resistance. In the case of five sheets, another sheet of the laminated glass was tested, and the glass was considered to have passed the test if the other sheet prevented the rigid sphere from penetrating therethrough within five seconds after the rigid sphere hit the sheet. In the same way, a rigid sphere having a mass of 2260 g and a diameter of 82 mm was dropped from heights of 5 m and 6 m on the center of each of six sheets of the laminated glass to evaluate the penetration resistance of the laminated glass.

(6) Bubble Formation Test A and Bubble Formation Test B (Bubble Formation State)

Each interlayer film was cut into a size of 30 cm length×15 cm width and stored for 10 hours at a temperature of 23° C. The both faces of the interlayer film were embossed. The ten point height of irregularities of the embossment was 30 μm. In the cut interlayer film, through holes (diameter of 6 mm) were formed at four intersections of positions 8 cm inside from the edges of the interlayer film in the lengthwise direction and positions 5 cm inside from the edges of the interlayer film in the crosswise direction.

An interlayer film with through holes was sandwiched between two transparent float glass sheets (30 cm length×15 cm width×2.5 mm thick) to give a laminate. The peripheral edge (2 cm width from each edge) of the laminate was heat-sealed to enclose air remaining in the embossment and in the through holes. The laminate was press-bonded under the conditions of 135° C. and a pressure of 1.2 MPa for 20 minutes so that the remaining air is dissolved in the interlayer film. In this manner, the laminated glass sheets used in the bubble formation test A and bubble formation test B was prepared.

Bubble Formation Test A (Bubble Formation State)

Five sheets of the laminated glass used in the bubble formation test A were prepared for each interlayer film. The prepared laminated glass sheets were left in an oven heated to 50° C. for 100 hours. The left laminated glass sheets were visually checked in a plan view for determination of the presence of bubble formation and the size of the bubbles. The bubble formation state evaluated based on the following criteria.

Bubbles generated in five laminated glass sheets was approximated by ellipses. The area of the ellipse was determined as the bubble formation areas. The areas of the ellipses in five laminated glass sheets were averaged. The proportion (percentage) of the average value of the areas of the ellipses (bubble formation area) relative to the area (30 cm×15 cm) of the laminated glass was calculated.

[Criteria for Evaluating the Bubble Formation State in the Bubble Formation Test A]

∘∘: No bubble formation was observed in all the five sheets.

∘: The proportion of the average value of the areas of the ellipses (bubble formation area) was less than 5%.

Δ: The proportion of the average value of the areas of the ellipses (bubble formation area) was at least 5% and less than 10%.

x: The proportion of the average value of the areas of the ellipses (bubble formation area) was at least 10%.

Bubble Formation Test B (Bubble Formation State)

A number of 30 sheets of the laminated glass to be used in the bubble formation test B were prepared for each interlayer film. The prepared laminated glass sheets were left in an oven heated to 50° C. for 24 hours. The left laminated glass sheets were visually checked. The number of laminated glass sheets in which bubble formation was visually observed was checked and evaluated based on the following criteria.

[Criteria for Evaluating the Bubble Formation State in the Bubble Formation Test B]

∘∘: The number of glass sheets in which bubble formation was visually observed was at most five.

∘: The number of glass sheets in which bubble formation was visually observed was at least six and at most 10.

Δ: The number of glass sheets in which bubble formation was visually observed was at least 11 and at most 15.

x: The number of glass sheets in which bubble formation was visually observed was at least 16.

(7) Elasticity G' Determined by the Testing Method A

Each polyvinyl acetal resin contained in the first layer of the interlayer film for laminated glass of each of the examples and comparative examples (polyvinyl acetal resin used in the first layer) (100 parts by weight) was sufficiently mixed and kneaded with triethyleneglycol di-2-ethylhexanoate (3GO) as a plasticizer to give a kneaded product. The resulting kneaded product was press-molded using a press molding machine to give a resin film A having an average thickness of 0.35 mm. The resin film A was left under conditions of 25° C. and a relative humidity of 30% for two hours. Then, the viscoelasticity of the resin film A was determined using an ARES-G2 produced by TA INSTRUMENTS. A parallel plate with a diameter of 8 mm was used as a geometry. The measurement was performed under the conditions where the temperature was lowered from 100° C. to −10° C. at a cooling rate of 3° C./min at a frequency of 1 Hz and a strain of 1%. The peak temperature of the loss factor in the measurement results was determined as a glass transition temperature Tg (° C.). The value of the elasticity G'(Tg+30) at (Tg+30)° C. and the value of the elasticity G'(Tg+80) at (Tg+80)° C. were read from the measurement results and the glass transition temperature Tg.

The case where the ratio (G'(Tg+80)/G'(Tg+30)) was at least 0.65 was determined as "o". The case where the ratio (G'(Tg+80)/G'(Tg+30)) was less than 0.65 was determined as "x".

(8) Elasticity G' Determined by the Testing Method B

The interlayer film for laminated glass of each of the examples and comparative examples was stored in a constant temperature and humidity room (humidity of 30% (±3%), temperature of 23° C.) for a month. Then, the surface layer, intermediate layer and surface layer were detached so that the intermediate layer was taken out. In a mold (2 cm length×2 cm width×0.76 mm thickness) positioned between two polyethylene terephthalate (PET) films, the detached intermediate layer (1 g) was placed. After preheating at a temperature of 150° C. and a pressure of 0 kg/cm² for 10 minutes, the intermediate layer was press-molded at 80 kg/cm² for 15 minutes. The press-molded intermediate layer was placed in a hand-press machine preliminary set to 20° C., and then pressed at 10 MPa for 10 minutes to be cooled. One of the PET films was removed from the mold positioned between two PET films. The resulting mold was stored in a constant temperature and humidity room (humidity of 30% (±3%), temperature of 23° C.) for 24 hours. Then, the viscoelasticity of the interlayer film was determined by using an ARES-G2 produced by TA INSTRUMENTS. A parallel plate with a diameter of 8 mm was used as a geometry. The measurement was performed under the conditions where the temperature was lowered from 100° C. to −10° C. at a cooling rate of 3° C./min at a frequency of 1 Hz and a strain of 1%. The peak temperature of the loss factor in the measurement results was determined as a glass transition temperature Tg (° C.). The value of the elasticity G'(Tg+30) at (Tg+30)° C. and the value of the elasticity G'(Tg+80) at (Tg+80)° C. were read from the measurement results and the glass transition temperature Tg. The ratio (G'(Tg+80)/G'(Tg+30)) was also calculated.

The case where the ratio (G'(Tg+80)/G'(Tg+30)) was at least 0.65 was determined as "o". The case where the ratio (G'(Tg+80) G'(Tg+30)) was less than 0.65 was determined as "x".

(9) Measurement of the Absolute Molecular Weight and Molecular Weight y
(Measurement of the Absolute Molecular Weight)

The absolute molecular weight and the polystyrene-equivalent molecular weight for obtaining the high molecular weight component X and the high molecular weight component Y mentioned in the synthesis 1 were values obtained as follows after detachment of the surface layer and the intermediate layer from the multilayer interlayer film.

For measurement of the absolute molecular weight, the multilayer interlayer film was left in a constant temperature and humidity room (humidity of 30% (±3%), temperature of 23° C.) for a month. Then, the surface layer and the intermediate layer were detached from the multilayer interlayer film. The detached intermediate layer was dissolved in tetrahydrofuran (THF) to give a 0.1 wt % solution. The resulting solution was analyzed using a Gel Permeation Chromatography (GPC) device ("RI: L2490, Autosampler: L-2200, Pump: L-2130, Column oven: L-2350, Column: series of GL-A120-S and GL-A100MX-S" produced by Hitachi High-Technologies Corporation). The GPC device was connected with a light scattering detector for GPC ("Model 1270 (RALS+VISCO)" produced by VISCOTEK) so that chromatograms by various detectors can be analyzed. The peaks of the polyvinyl acetal component in the chromatograms by a RI detector and a RALS detector were analyzed using analysis software (OmniSEC). In this manner, the absolute molecular weight of the polyvinyl acetal resin in each elution time was determined. The proportion of the area of the region where the absolute molecular weight of the polyvinyl acetal resin is at least 1 million occupying in the peak area of the polyvinyl acetal resin which is detected by using a RI detector was expressed in percentage.

The following equations are satisfied by the peak of each component in the chromatogram:

$$A_{RI} = c \times (dn/dc) \times K_{RI}$$ Equation (1); and $$A_{RALS} = c \times M \times (dn/dc)^2 \times K_{RALS}$$ Equation (2).

Here, c indicates a polymer concentration of the solution, (dn/dc) indicates a refractive index increment, M indicates the absolute molecular weight, and K indicates the system's coefficient.

Specifically, polystyrene of known c, M, and (dn/dc) (Poly CAL (registered trade mark) produced by VISCOTEK, TDS-PS-NB Mw=98390, dn/dc=0.185) was used as a standard sample to give a 0.1 wt % solution in THF. The system's coefficient of each detector was determined using the equations (1) and (2) based on the GPC measurement results of the obtained polystyrene solution.

The detached interlayer was dissolved in THF so that a solution in THF was prepared. The absolute molecular weight M of the polyvinyl acetal resin was determined using the equations (1) and (2) based on the GPC measurement results of the obtained polyvinyl acetal resin solution.

For analysis of the intermediate layer (containing the polyvinyl acetal resin and the plasticizer), the concentration of the polyvinyl acetal resin of the polyvinyl acetal resin solution is needed to be obtained. The concentration of the polyvinyl acetal resin is calculated from the following measurement results of the plasticizer content.

Measurement of the Plasticizer Content:

Platicizer-THF solutions were prepared by dissolving the plasticizer in THF to the plasticizer contents of 10 wt %, 15 wt %, 20 wt %, 25 wt %, 30 wt %, 35 wt %, 40 wt %, 45 wt %, and 50 wt %. The GPC measurement was performed on each obtained plasticizer-THF solution so that the peak area of the plasticizer was obtained. The peak area of the plasticizer relative to the concentration of the plasticizer was plotted to give an approximation straight line. Next, the GPC measurement was performed on the solution in THF obtained by dissolving the intermediate layer in THF. Based on the measurement result and the approximation straight line, the plasticizer content is determined from the peak area of the plasticizer.

(Determination of the Molecular Weight y)

In the same manner as the method for determining the absolute molecular weight, the polystyrene-equivalent molecular weight was determined by gel permeation chromatography (GPC). Based on the proportion of the area corresponding to the region where the molecular weight is at least 1 million occupying in the peak area (measurement result of GPC) detected by a RI detector, the proportion (%) of the high molecular weight component Y having a molecular weight y of at least 1 million occupying in the polyvinyl acetal resin was calculated.

For determination of the polystyrene-equivalent molecular weight, GPC measurement was performed on polystyrene of known molecular mass as a standard sample. As a polystyrene standard sample ("Shodex Standard SM-105", "Shodex Standard SH-75" produced by SHOWA DENKO K. K.), 14 samples are used which have a weight average molecular weight of 580, 1260, 2960, 5000, 10100, 21000, 28500, 76600, 196000, 630000, 1130000, 2190000, 3150000, and 3900000. The approximation straight line obtained by plotting the weight average molecular weight relative to the elution time indicated by the peak top of the sample peak is used as a calibration curve. The surface layer and the intermediate layer were detached from the multilayer interlayer film left in a constant temperature and humidity room (humidity of 30% (±3%), temperature of 23° C.) for a month. The detached intermediate layer was dissolved in tetrahydrofuran (THF) to give a 0.1 wt % solution. The resulting solution was analyzed by a GPC device so that the peak area of the polyvinyl acetal resin in the intermediate layer was determined. Based on the elution time and the standard curve of the polyvinyl acetal resin in the intermediate layer, the area corresponding to the region where the polystyrene-equivalent molecular weight of the polyvinyl acetal resin in the intermediate layer was at least 1 million was calculated. The area corresponding to the region where the polystyrene-equivalent molecular weight of the polyvinyl acetal resin in the intermediate layer was divided by the peak area of the polyvinyl acetal resin in the intermediate layer, and the resulting value was expressed in percentage (%). Accordingly, the proportion (%) of the high molecular weight component Y having the molecular weight y of at least 1 million occupying in the polyvinyl acetal resin was calculated.

Tables 1 and 2 show the results.

TABLE 1

| | | | | Ex. 1 | Ex. 2 | Ex. 3 | Ex. 4 | Ex. 5 |
|---|---|---|---|---|---|---|---|---|
| Ingredients of the first layer | Kind of the polyvinyl acetal resin | Carbon number of the acetal group | | 4 | 4 | 4 | 4 | 4 |
| | | Average degree of polymerization | | 3000 | 3000 | 3000 | 3000 | 2700 |
| | | The hydroxyl content | mol % | 22.5 | 22.5 | 20.4 | 17.8 | 24.8 |
| | | Acetylation degree | mol % | 12.8 | 12.8 | 7.1 | 1 | 17.5 |
| | | Butyralization degree | mol % | 64.7 | 64.7 | 72.5 | 81.2 | 57.7 |
| | Amount of the polyvinyl acetal resin | | Parts by weight | 100 | 100 | 100 | 100 | 100 |
| | Kind and amount of the first plasticizer | Bis (2-butoxyethyl) adipate | Parts by weight | 50 | | 50 | 50 | 60 |
| | | Bis [2-(2-butoxyethoxy) ethyl] adipate | Parts by weight | | 50 | | | |
| | Kind and amount of the second plasticizer | Triethyleneglycol di-2-ethylhexanoate (3GO) | Parts by weight | | | | | |
| | First plasticizer:Second plasticizer (weight ratio) | | | 10:0 | 10:0 | 10:0 | 10:0 | 10:0 |
| Ingredients of the second layer | Kind of the polyvinyl acetal resin | Carbon number of the acetal group | | 4 | 4 | 4 | 4 | 4 |
| | | Average degree of polymerization | | 3000 | 3000 | 3000 | 3000 | 3000 |
| | | The hydroxyl content | mol % | 30.5 | 30.5 | 30.5 | 30.5 | 30.5 |
| | | Acetylation degree | mol % | 1 | 1 | 1 | 1 | 1 |
| | | Butyralization degree | mol % | 68.5 | 68.5 | 68.5 | 68.5 | 68.5 |
| | Amount of the polyvinyl acetal resin | | Parts by weight | 100 | 100 | 100 | 100 | 100 |
| | Kind and amount of the plasticizer | Triethyleneglycol di-2-ethylhexanoate (3GO) | Parts by weight | 40 | 40 | 40 | 40 | 40 |
| Evaluation | Sound insulation | Temperature T1 indicating the maximum value of tan δ of the first layer | ° C. | −1.24 | 1.22 | 3.21 | 1.21 | −1.21 |
| | | Temperature T2 indicating the maximum value of tan δ of the second layer | ° C. | 30.5 | 30.5 | 30.5 | 30.5 | 30.5 |
| | | Loss tangent (20° C., around 100 Hz) | | 0.29 | 0.3 | 0.31 | 0.34 | 0.27 |
| | Slippage | | mm | 0.4 | 0.4 | 0.7 | 0.8 | 0.9 |
| | Evaluation on bleeding | | | ○ | ○ | ○ | ○ | ○ |
| | Penetration resistance | | 4 m | Passed | Passed | Passed | Passed | Passed |
| | | | 5 m | Passed | Passed | Passed | Passed | Passed |
| | | | 6 m | Passed | Passed | Passed | Passed | Passed |
| | Bubble formation test A (Bubble formation state) | | | ○○ | ○○ | ○○ | ○○ | ○○ |
| | Bubble formation test B (Bubble formation state) | | | ○ | ○ | ○ | ○ | ○ |
| | Testing method A: G'(Tg + 80)/G'(Tg + 30) | | | ○ | ○ | ○ | ○ | — |
| | Testing method B: G'(Tg + 80)/G'(Tg + 30) | | | ○ | ○ | ○ | ○ | — |

TABLE 2

| | | | | Ex. 6 | Ex. 7 | Ex. 8 | Comp. Ex. 1 | Comp. Ex. 2 |
|---|---|---|---|---|---|---|---|---|
| Ingredients of the first layer | Kind of the polyvinyl acetal resin | Carbon number of the acetal group | | 4 | 4 | 4 | 4 | 4 |
| | | Average degree of polymerization | | 3000 | 3000 | 3000 | 3000 | 3000 |
| | | The hydroxyl content | mol % | 22.5 | 22.5 | 22.5 | 22.5 | 22.5 |
| | | Acetylation degree | mol % | 12.8 | 12.8 | 12.8 | 12.8 | 12.8 |
| | | Butyralization degree | mol % | 64.7 | 64.7 | 64.7 | 64.7 | 64.7 |
| | Amount of the polyvinyl acetal resin | | Parts by weight | 100 | 100 | 100 | 100 | 100 |

TABLE 2-continued

| | | | | Ex. 6 | Ex. 7 | Ex. 8 | Comp. Ex. 1 | Comp. Ex. 2 |
|---|---|---|---|---|---|---|---|---|
| | Kind and amount of the first plasticizer | Bis (2-butoxyethyl) adipate | Parts by weight | 10 | 30 | 50 | 50 | |
| | | Bis [2-(2-butoxyethoxy) ethyl] adipate | Parts by weight | | | | | |
| | Kind and amount of the second plasticizer | Triethyleneglycol di-2-ethylhexanoate (3GO) | Parts by weight | 50 | 30 | 10 | | 60 |
| | First plasticizer:Second plasticizer (weight ratio) | | | 1.7:8.3 | 5:5 | 8.3:1.7 | 10:0 | 0:10 |
| Ingredients of the second layer | Kind of the polyvinyl acetal resin | Carbon number of the acetal group | | 4 | 4 | 4 | | 4 |
| | | Average degree of polymerization | | 3000 | 3000 | 3000 | | 3000 |
| | | The hydroxyl content | mol % | 30.5 | 30.5 | 30.5 | | 30.5 |
| | | Acetylation degree | mol % | 1 | 1 | 1 | | 1 |
| | | Butyralization degree | mol % | 68.5 | 68.5 | 68.5 | | 68.5 |
| | Amount of the polyvinyl acetal resin | | Parts by weight | 100 | 100 | 100 | | 100 |
| | Kind and amount of the plasticizer | Triethyleneglycol di-2-ethylhexanoate (3GO) | Parts by weight | 40 | 40 | 40 | | 40 |
| Evaluation | Sound insulation | Temperature T1 indicating the maximum value of tan δ of the first layer | ° C. | −0.65 | 0.21 | −4.21 | −1.24 | 3.2 |
| | | Temperature T2 indicating the maximum value of tan δ of the second layer | ° C. | 30.5 | 30.5 | 30.5 | — | 30.5 |
| | | Loss tangent (20° C., around 100 Hz) | | 0.29 | 0.32 | 0.36 | 0.32 | 0.23 |
| | Slippage | | mm | 0.4 | 0.5 | 0.4 | 1.2 | 0.5 |
| | Evaluation on bleeding | | | ○ | ○○ | ○○ | x | ○ |
| | Penetration resistance | | 4 m | Passed | Passed | Passed | Failed | Passed |
| | | | 5 m | Passed | Passed | Passed | Failed | Passed |
| | | | 6 m | Passed | Passed | Passed | Failed | Passed |
| | Bubble formation test A (Bubble formation state) | | | ○○ | ○○ | ○○ | — | ○○ |
| | Bubble formation test B (Bubble formation state) | | | ○ | ○ | ○ | — | ○ |
| | Testing method A: G'(Tg + 80)/G'(Tg + 30) | | | ○ | ○ | ○ | — | ○ |
| | Testing method B: G'(Tg + 80)/G'(Tg + 30) | | | ○ | ○ | ○ | — | ○ |

The elasticity G' of the resin film B (first layer) containing the polyvinyl acetal resin of the first layer and the plasticizer of the first layer in amounts shown in Table 1 was measured after migration of the plasticizer among layers of the multilayer interlayer film. According to Tables 1 and 2, the ratio (G'(Tg+80)/G'(Tg+30)) of the resin film B and the ratio (G'(Tg+80)/G'(Tg+30)) of the resin A containing the polyvinyl acetal resin (100 parts by weight) contained in the first layer and 3GO (60 parts by weight) are almost the same in the interlayer films for laminated glasses of Examples 1 to 4, and 6 to 8, and Comparative Example 2.

EXAMPLE 9

The polyvinyl butyral resin A obtained in Synthesis 1 (100 parts by weight, carbon number of the acetal group:4, average degree of polymerization: 3000, hydroxyl content: 22.5 mol %, acetylation degree: 12.8 mol %, butyralization degree: 64.7 mol %), bis(2-butoxyethyl) adipate (42 parts by weight) as the first plasticizer, and triethyleneglycol di-2-ethylhexanoate (18 parts by weight) as the second plasticizer were sufficiently mixed and kneaded with a mixing roll to give a composition. It is to be noted that the used polyvinyl butyral resin was the polyvinyl butyral resin acetalized by n-butylaldehyde.

The resulting composition was sandwiched between two fluororesin sheets via 0.8 mm-thick clearance plates. The laminate was press-molded at 150° C. to give a multilayer interlayer film A having a thickness of 0.8 mm.

Examples 10 to 12 and Comparative Example 3

The interlayer films A were produced by using the polyvinyl butyral resins and the plasticizers shown in Table 3 in the same manner as in Example 9. The used polyvinyl butyral resin was the polyvinyl butyral resin acetalized by n-butylaldehyde. The polyvinyl acetal resin used in the first layer in each of Examples 10 to 12 and Comparative Example 3 was the polyvinyl butyral resin A obtained in Synthesis 1.

EXAMPLE 13

The polyvinyl butyral resin A obtained in Synthesis 1 (100 parts by weight, carbon number of the acetal group: 4, average degree of polymerization: 3000, hydroxyl content: 22.5 mol %, acetylation degree: 12.8 mol %, butyralization degree: 64.7 mol %), bis(2-butoxyethyl) adipate (10 parts by weight) as the first plasticizer, and triethyleneglycol di-2-ethylhexanoate (50 parts by weight) as the second plasticizer were sufficiently mixed and kneaded with a mixing roll to give a composition for a sound insulation layer. The used polyvinyl butyral resin was the polyvinyl butyral resin acetalized by n-butylaldehyde.

The resulting composition for a sound insulation layer was sandwiched between two fluororesin sheets via 0.1 mm-thick clearance plates. The laminate was press-molded at 150° C. to give an interlayer film B1 (first layer, sound insulation layer) having a thickness of 0.1 mm.

The polyvinyl butyral resin (100 parts by weight, carbon number of the acetal group: 4, average degree of polymerization: 3000, hydroxyl content: 30.5 mol %, acetylation degree: 1 mol %, butyralization degree: 68.5 mol %) and triethyleneglycol di-2-ethylhexanoate (40 parts by weight) were sufficiently mixed and kneaded with a mixing roll to give a composition for protective layer. The used polyvinyl butyral resin was the polyvinyl butyral resin acetalized by n-butylaldehyde.

The resulting composition for a protective layer was sandwiched between two fluororesin sheets via 0.35 mm-thick clearance plates. The laminate was press-molded at 150° C. to give an interlayer film B2 (second layer, protective layer) having a thickness of 0.35 mm.

An interlayer film B2, an interlayer film B1, and an interlayer film 22 were stacked in the stated order to give a laminate having a multilayer structure including a protective layer/a sound insulation layer/a protective layer (a second layer/a first layer/a second layer). The resulting laminate was sandwiched between two fluororesin sheets via 0.8 mm-thick clearance plates. The laminate was press-molded at 150° C. to give a multilayer interlayer film B having a thickness of 0.8 mm.

EXAMPLES 14 and 15

The interlayer films B1 and B2 were produced in the same manner as in Example 13 except that the amount of the plasticizer in the composition for a sound insulation layer was changed as shown in Table 4. Then, multilayer interlayer films were produced. In Examples 14 and 15, the polyvinyl acetal resin used in the first layer was the polyvinyl butyral resin A obtained in Synthesis 1.

Evaluation of Examples 9 to 15 and Comparative Example 3

The interlayer films of Examples 9 to 15 and Comparative Example 3 were evaluated with regard to the following items (1A) and (1B). In addition, the interlayer films of Examples 9 to 15 and Comparative Example 3 were also subjected to (4) Evaluation on bleeding mentioned above. The interlayer films of Examples 13 to 15 and the polyvinyl acetal resins used in the interlayer films were also subjected to (6) Bubble formation test A and Bubble formation test B (bubble formation state), and determination of (7) Elasticity G' by the testing method A and (8) Elasticity G' by the testing method B.

(1A) Sound Insulation: Temperatures T1 and T2 Indicating the Maximum Value of Tan δ at a Frequency of 1 Hz The interlayer film A obtained in each of Examples 9 to 12 and Comparative Example 3 was cut into a circular shape having a diameter of 8 mm as an evaluation sample. The evaluation sample was examined for the dispersion of dynamic viscoelasticity with temperature under the conditions of a strain of 1.0%, frequency of 1 Hz, and heating rate of 3° C./min with use of a viscoelasticity measuring device ("ARES" produced by Rheometrics) by a shearing method. Accordingly, the temperature T1 indicating the maximum value of tan δ at a frequency of 1 Hz was obtained.

The interlayer films B1-2 were obtained in the same manner as production of the interlayer films B1 of Examples 13 to 15 except that the thickness was changed to 0.8 mm so that the temperature indicating the maximum value of tan δ at a frequency of 1 Hz was measured. In addition, the interlayer films B2-2 were obtained in the same manner as production of the interlayer films B2 of Examples 13 to 15 except that the thickness was changed to 0.8 mm. The resulting interlayer films B1-2 and B2-2 were each cut into a circular shape having a diameter of 8 mm to give an evaluation sample.

The dynamic viscoelasticity of the evaluation sample using the interlayer film B1-2 was determined by the above method, and the temperature T1 indicating the maximum value of tan δ at a frequency of 1 Hz was determined. The dynamic viscoelasticity of the evaluation sample using the interlayer film B2-2 was determined by the above method, and the temperature T1 indicating the maximum value of tan δ at a frequency of 1 Hz was determined.

(2A) Sound Insulation: Loss Factor

The resulting interlayer film A or multilayer interlayer film B was cut into a size of 30 mm length×320 mm width. The interlayer film A or multilayer interlayer film B was then sandwiched between two transparent float glass sheets (25 mm length×305 mm width×2.0 mm thickness) and held in a vacuum laminator at 90° C. for 30 minutes for vacuum press to give a laminate. In the laminate, the interlayer film A or multilayer interlayer film B protruding from the glass sheet was trimmed so that the evaluation sample was prepared. The loss factor of the evaluation sample was determined using a measuring device "SA-01" (produced by R10N Co., Ltd.) at 20° C. by the center excitation method. The loss factor in a primary mode (around 1000 Hz) of resonant frequencies of the obtained loss factor was evaluated.

Tables 3 and 4 show the results.

TABLE 3

|  |  |  |  | Ex. 9 | Ex. 10 | Ex. 11 | Ex. 12 | Comp. Ex. 3 |
|---|---|---|---|---|---|---|---|---|
| Ingredients | Kind of the polyvinyl acetal resin | Carbon number of the acetal group |  | 4 | 4 | 4 | 4 | 4 |
|  |  | Average degree of polymerization |  | 3000 | 3000 | 2700 | 4000 | 3000 |
|  |  | The hydroxyl content | mol % | 22.5 | 22.5 | 22.5 | 22.5 | 22.5 |
|  |  | Acetylation degree | mol % | 12.8 | 12.8 | 12.8 | 12.8 | 12.8 |
|  |  | Butyralization degree | mol % | 64.7 | 64.7 | 64.7 | 64.7 | 64.7 |
|  | Amount of the polyvinyl acetal resin |  | Parts by weight | 100 | 100 | 100 | 100 | 100 |
|  | Kind and amount of the first plasticizer | Bis(2-butoxyethyl) adipate | Parts by weight | 42 |  | 6 | 30 |  |
|  |  | Bis[2-(2-butoxyethoxy)ethyl] adipate | Parts by weight |  | 42 |  |  |  |
|  | Kind and amount of the second plasticizer | Triethyleneglycol di-2-ethylhexanoate (3GO) | Parts by weight | 18 | 18 | 54 | 30 | 60 |
|  | First plasticizer:Second plasticizer (weight ratio) |  |  | 7:3 | 7:3 | 1:9 | 5:5 | 0:10 |
| Evaluation | Sound insulation | Temperature T1 indicating the maximum value of tan δ of the first layer | ° C. | −3.24 | −1.24 | 2.11 | 0.21 | 3.21 |
|  |  | Loss factor (20° C., around 100 Hz) |  | 0.28 | 0.29 | 0.34 | 0.32 | 0.23 |
|  | Evaluation on bleeding |  |  | ◯ | ◯ | ◯ | ◯ | ◯ |

TABLE 4

| | | | | Ex. 13 | Ex. 14 | Ex. 15 |
|---|---|---|---|---|---|---|
| Ingredients of the sound insulation layer | Kind of the polyvinyl acetal resin | Carbon number of the acetal group | | 4 | 4 | 4 |
| | | Average degree of polymerization | | 3000 | 3000 | 3000 |
| | | The hydroxyl content | mol % | 22.5 | 22.5 | 22.5 |
| | | Acetylation degree | mol % | 12.8 | 12.8 | 12.8 |
| | | Butyralization degree | mol % | 64.7 | 64.7 | 64.7 |
| | Amount of the polyvinyl acetal resin | | Parts by weight | 100 | 100 | 100 |
| | Kind and amount of the first plasticizer | Bis(2-butoxyethyl) adipate | Parts by weight | 10 | 30 | 50 |
| | | Bis(2-(2-butoxyethoxy)ethyl) adipate | Parts by weight | | | |
| | Kind and amount of the second plasticizer | Triethyleneglycol di-2-ethylhexanoate (3GO) | Parts by weight | 50 | 30 | 10 |
| | First plasticizer:Second plasticizer (weight ratio) | | | 1.7:8.3 | 5:5 | 8.3:1.7 |
| Ingredients of the protective layer | Kind of the polyvinyl acetal resin | Carbon number of the acetal group | | 4 | 4 | 4 |
| | | Average degree of polymerization | | 3000 | 3000 | 3000 |
| | | The hydroxyl content | mol % | 30.5 | 30.5 | 30.5 |
| | | Acetylation degree | mol % | 1 | 1 | 1 |
| | | Butyralization degree | mol % | 68.5 | 68.5 | 68.5 |
| | Amount of the polyvinyl acetal resin | | Parts by weight | 100 | 100 | 100 |
| | Kind and amount of the plasticizer | Triethyleneglycol di-2-ethylhexanoate (3GO) | Parts by weight | 40 | 40 | 40 |
| Evaluation | Sound insulation | Temperature T1 indicating the maximum value of tan δ of the sound insulation layer | ° C. | −0.65 | 0.21 | −4.21 |
| | | Temperature T2 indicating the maximum value of tan δ of the protective layer | ° C. | 30.5 | 30.5 | 30.5 |
| | | Loss factor (20° C., around 100 Hz) | | 0.29 | 0.32 | 0.36 |
| | Evaluation on bleeding | | | ◯ | ◯◯ | ◯◯ |
| | Bubble formation test A (Bubble formation state) | | | ◯◯ | ◯◯ | ◯◯ |
| | Bubble formation test B (Bubble formation state) | | | ◯ | ◯ | ◯ |
| | Testing method A: G'(Tg + 80)/G'(Tg + 30) | | | ◯ | ◯ | ◯ |
| | Testing method B: G'(Tg + 80)/G'(Tg + 30) | | | ◯ | ◯ | ◯ |

The elasticity G' of the resin film B (first layer) containing the polyvinyl acetal resin of the first layer and the plasticizer of the first layer in amounts shown in Table 1 was measured after migration of the plasticizer among layers of the multilayer interlayer film. According to Table 4, the ratio (G'(Tg+80)/G'(Tg+30)) of the resin film B and the ratio (G'(Tg+80)/G'(Tg+30)) of the resin A containing the polyvinyl acetal resin (100 parts by weight) contained in the first layer and 3GO (60 parts by weight) are almost the same in the interlayer film for laminated glasses of Examples 13 to 15.

EXPLANATION OF SYMBOLS

1 Laminated glass
2A Interlayer film
2 First layer
2a One face
2b The other face
11 Laminated glass
12 Interlayer film
13 Second layer
13a Outer face
14 First layer
14a One face
14b The other face
15 Second layer
15a Outer face
21 First component for laminated glass
22 Second component for laminated glass

The invention claimed is:

1. An interlayer film for laminated glass having
    a multilayer structure comprising at least two layers including a first layer and a second layer stacked at least on one face of the first layer, the at least two layers being bonded together, wherein the second layer contains a thermoplastic resin and a plasticizer, and
    wherein the first layer contains a thermoplastic resin and a first plasticizer represented by the formula (1):

[Chem. 1]

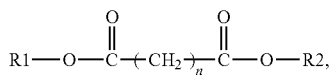

Formula (1)

in which R1 and R2 each represent an organic group containing at least one ether bond and n represents an integer of 2 to 8, and
    the first layer further contains a second plasticizer that is a diester compound, and/or the thermoplastic resin of the second layer is and a polyvinyl acetal resin with a hydroxyl content of 25 to 40 mol %, and
    the polyvinyl acetal resin in the second layer has an acetal group with 3 or 4 carbon atoms, an acetalization degree of 60 to 75 mol %, and an acetylation degree of 0 to 10 mol %.

2. The interlayer film for laminated glass according to claim 1,
    wherein R1 and R2 in the formula (1) each represent a group containing a carbon atom and an oxygen atom in a total number of at most 12.

3. The interlayer film for laminated glass according to claim 1, wherein, in the formula (1), R1 is a group represented by the formula (21):

[Chem. 4]

Formula (21)

in which R21 represents an alkyl group having 1 to 10 carbon atom(s), R22 represents an alkylene group having 1 to 10 carbon atom(s), and m1 represents an integer of 1 to 5, and R2 is a group represented by the formula (26):

[Chem. 5]

Formula (26)

in which R26 represents an alkyl group having 1 to 10 carbon atom(s), R27 represents an alkylene group having 1 to 10 carbon atom(s), and m2 represents an integer of 1 to 5.

4. The interlayer film for laminated glass according to claim 1, wherein, the first layer further contains the second plasticizer that is a diester compound, and the second plasticizer is represented by the formula (51):

[Chem. 6]

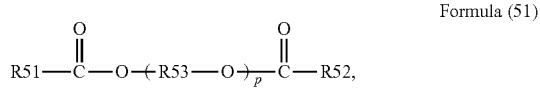

Formula (51)

in which R51 and R52 each represent an organic group having 5 to 10 carbon atoms, R53 represents an ethylene group, isopropylene group, or n-propylene group, and p represents an integer of 3 to 10.

5. The interlayer film for laminated glass according to claim 1, wherein, the first layer further contains the second plasticizer that is a diester compound, and the first layer contains the first plasticizer and the second plasticizer at a weight ratio of 1:9 to 8.5:1.5.

6. The interlayer film for laminated glass according to claim 1, wherein, the thermoplastic resin of the second layer is the polyvinyl acetal resin with a hydroxyl content of 25 to 40 mol %, and the plasticizer in the second layer is a second plasticizer that is a diester compound.

7. The interlayer film for laminated glass according to claim 6, wherein the second plasticizer that is a diester compound in the second layer is represented by the formula (51):

[Chem. 7]

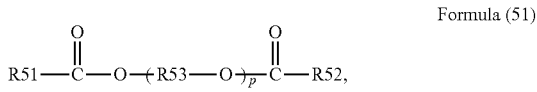

Formula (51)

in which R51 and R52 each represent an organic group having 5 to 10 carbon atoms, R53 represents an ethylene group, isopropylene group or n-propylene group, and p represents an integer of 3 to 10.

8. The interlayer film for laminated glass according to claim 1, wherein, the thermoplastic resin of the second layer is the polyvinyl acetal resin with a hydroxyl content of 25 to 40 mol %, and the first layer further contains a second plasticizer that is a diester compound.

9. The interlayer film for laminated glass according to claim 8, wherein the second plasticizer that is a diester compound in the first layer is represented by the formula (51):

[Chem. 8]

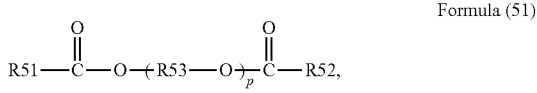

Formula (51)

in which R51 and R52 each represent an organic group having 5 to 10 carbon atoms, R53 represents an ethylene group, isopropylene group or n-propylene group, and p represents an integer of 3 to 10.

10. The interlayer film for laminated glass according to claim 1, wherein, the thermoplastic resin of the second layer is the polyvinyl acetal resin with a hydroxyl content of 25 to 40 mol %, and the first layer further contains the second plasticizer that is a diester compound and the first layer contains the first plasticizer and the second plasticizer at a weight ratio of 1:9 to 8.5:1.5.

11. The interlayer film for laminated glass according to claim 1, wherein the thermoplastic resin in the first layer is a polyvinyl acetal resin.

12. The interlayer film for laminated glass according to claim 11, wherein the polyvinyl acetal resin in the first layer has a hydroxyl content of at most 25 mol %.

13. The interlayer film for laminated glass according to claim 11, wherein the polyvinyl acetal resin in the first layer is obtained by acetalization of a polyvinyl alcohol having an average degree of polymerization of 2700 to 5000.

14. The interlayer film for laminated glass according to claim 1, wherein the thermoplastic resin in the first layer contains a high molecular weight component having an absolute molecular weight of at least 1 million and the high molecular weight component accounts for at least 7.4% of the thermoplastic resin in the first layer, or the thermoplastic resin in the first layer contains a high molecular weight component having a polystyrene-equivalent molecular weight of at least 1 million and the high molecular weight component accounts for at least 9% of the thermoplastic resin in the first layer.

15. The interlayer film for laminated glass according to claim 1, wherein, when the first layer is used as a resin film with a glass transition temperature of Tg(° C.) for measurement of the viscoelasticity, an elasticity G'(Tg+80) at (Tg+80)° C. and an elasticity G'(Tg+30) at (Tg+30)° C. have a ratio (G'(Tg+80)/G'(Tg+30)) of at least 0.65.

16. The interlayer film for laminated glass according to claim 1, wherein the thermoplastic resin in the first layer is a polyvinyl acetal resin, and when the viscoelasticity of a resin film containing 100 parts by weight of the polyvinyl acetal resin in the first layer and 60 parts by weight of triethylene glycol di-2-ethylhexanoate (3GO) as a plasticizer and having a glass transition temperature of Tg(° C.) for measurement of the viscoelasticity, an elasticity G'(Tg+80) at (Tg+80)° C. and an elasticity G'(Tg+30) at (Tg+30)° C. have a ratio (G'(Tg+80)/G'(Tg+30)) of at least 0.65.

17. The interlayer film for lam mated glass according to claim 1, wherein the thermoplastic resin in the first layer is a polyvinyl acetal resin, and the polyvinyl acetal resin in the first layer is obtained by acetalization of a polyvinyl alcohol resin baying an average degree of polymerization of more than 3000.

18. The interlayer film for laminated glass according to claim 1, wherein the thermoplastic resin in the first layer is a polyvinyl acetal resin, and the polyvinyl acetal resin in the first layer has an acetylation degree of at least 8 mol %, or an acetylation degree of less than 8 mol % and an acetalization degree of at least 68 mol %.

19. The interlayer film for laminated glass according to claim 18, wherein the polyvinyl acetal resin in the first layer has an acetylation degree of at least 8 mol %.

20. The interlayer film for laminated glass according to claim 18, wherein the polyvinyl acetal resin in the first layer has an acetylation degree of less than 8 mol % and an acetalization degree of at least 68 mol %.

21. The interlayer film for laminated glass according to claim 1, wherein the interlayer film includes the first layer containing the thermoplastic resin, the first plasticizer represented by the formula (1), and the second plasticizer that is a diester compound.

22. The interlayer film for laminated glass according to claim 1, wherein the thermoplastic resin of the second layer is the polyvinyl acetal resin with a hydroxyl content of 25 to 40 mol %.

23. The interlayer film for laminated glass according to claim 1, wherein the thermoplastic resin in the first layer is a polyvinyl acetal resin, the thermoplastic resin of the second layer is a polyvinyl acetal resin, the amount of the plasticizer is at least 50 parts by weight for 100 pans by weight of the polyvinyl acetal resin in the first layer, a hydroxyl content in the polyvinyl acetal resin in the first layer is lower than a hydroxyl content the polyvinyl acetal resin in the second layer, a difference in the hydroxyl content is at most 9.2 mol % between the polyvinyl acetal resin in the first layer and the polyvinyl acetal resin in the second layer, and the polyvinyl acetal resin in the first layer has an acetylation degree of at most 8 mol % when the difference in the hydroxyl content is more than 8.5 mol % and at most 9.2 mol % between the polyvinyl acetal resin in the first layer and the polyvinyl acetal resin in the second layer.

24. A laminated glass comprising:
a first component for laminated glass;
a second component for laminated glass;
an interlayer film between the first component for laminated glass and the second component for laminated glass,
wherein the interlayer film includes the interlayer film for laminated glass according to claim 1.

25. The interlayer film for laminated glass according to claim 1, wherein the thermoplastic resin of the second layer is a polyvinyl acetal resin and the first layer further contains the second plasticizer that is a diester compound, wherein the thermoplastic resin in the first layer is a polyvinyl acetal resin, and a hydroxyl content in the polyvinyl acetal resin in the first layer is lower than a hydroxyl content in the polyvinyl acetal resin in the second layer.

* * * * *

UNITED STATES PATENT AND TRADEMARK OFFICE
CERTIFICATE OF CORRECTION

PATENT NO.      : 8,790,784 B2  
APPLICATION NO. : 13/809885  
DATED           : July 29, 2014  
INVENTOR(S)     : Shimamoto et al.

Page 1 of 1

It is certified that error appears in the above-identified patent and that said Letters Patent is hereby corrected as shown below:

In the Claim

Claim 1, Column 44, line 57, the term "and" should be deleted.

Signed and Sealed this  
Twenty-first Day of October, 2014

Michelle K. Lee  
*Deputy Director of the United States Patent and Trademark Office*